US012563612B2

(12) United States Patent (10) Patent No.: US 12,563,612 B2
Karimidehkordi et al. (45) Date of Patent: Feb. 24, 2026

(54) TIMING ADVANCE ACQUISITION, MANAGEMENT, AND REPORTING

(71) Applicant: Nokia Technologies Oy, Espoo (FI)

(72) Inventors: Ali Karimidehkordi, Munich (DE); Ahmad Awada, Munich (DE); Timo Koskela, Oulu (FI); Sanjay Goyal, Denville, NJ (US); Panagiotis Spapis, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 277 days.

(21) Appl. No.: 18/296,889

(22) Filed: Apr. 6, 2023

(65) Prior Publication Data

US 2024/0340981 A1    Oct. 10, 2024

(51) Int. Cl.
H04W 76/10 (2018.01)
H04W 56/00 (2009.01)
H04W 76/20 (2018.01)

(52) U.S. Cl.
CPC ......... H04W 76/10 (2018.02); H04W 56/005 (2013.01); H04W 76/20 (2018.02)

(58) Field of Classification Search
CPC ... H04W 76/10; H04W 76/20; H04W 56/005; H04W 36/08; H04W 56/0001; H04W 28/10; H04W 36/0005; H04W 36/0083
USPC ......... 370/329, 331, 332; 455/436, 439, 438
See application file for complete search history.

(56) References Cited

U.S. PATENT DOCUMENTS

2022/0191748 A1    6/2022  Viering et al.
2024/0155456 A1 *  5/2024  Akl et al. .......... H04W 36/0055
2024/0163750 A1 *  5/2024  Aurkayastha et al. .......................
    H04W 36/00837

FOREIGN PATENT DOCUMENTS

WO      WO-2021203922 A1 *  10/2021  .......... H04W 56/001
WO      WO-2023128726 A1 *  7/2023   .......... H04L 5/0053

OTHER PUBLICATIONS

Extended European Search Report for application No. 24161448.6 dated Sep. 9, 2024.
Zhang, et al., : "38.300 running CR for introduction of NR further mobility enhancements", 3rd Generation Partnership Project (3GPP), dated Feb. 17, 2023, 14 pages.

* cited by examiner

*Primary Examiner* — Huy D Vu
(74) *Attorney, Agent, or Firm* — Carter, DeLuca & Farrell LLP

(57) ABSTRACT

A user equipment apparatus (UE) includes processor(s) and memory storing instructions. The instructions, when executed by the processor(s), cause the UE to: establish a connection with a first network node via a serving cell, where the first network node supports the serving cell and supports at least one of distributed unit functionality or a layer 2 protocol of a radio access network (RAN); receive, from a second network node supporting at least one of central unit control plane functionality or a layer 3 protocol of the RAN, a radio resource control (RRC) message including configuration information relating to timing advance, where the configuration information prepares the UE for at least one candidate target cell with which the UE may connect, where the RRC message is received prior to the UE connecting with any of the at least one candidate target cell; and implement a configuration based on the configuration information.

1 Claim, 11 Drawing Sheets

TIMING ADVANCE ACQUISITION, MANAGEMENT, AND REPORTING

FIELD

Various example embodiments relate generally to wireless networking and, more particularly, to timing advance management in wireless networking.

BACKGROUND

Wireless networking provides significant advantages for user mobility. A user's ability to remain connected while on the move provides advantages not only for the user, but also provides greater efficiency and productivity for society as a whole. As user expectations for connection reliability, data speed, and device battery life become more demanding, technology for wireless networking must also keep pace with such expectations. Accordingly, there is continuing interest in improving wireless networking technology.

SUMMARY

In accordance with aspects of the disclosure, a user equipment apparatus includes at least one processor and at least one memory storing instructions. The instructions, when executed by the at least one processor, cause the user equipment apparatus at least to: establish a connection with a first network node via a serving cell, where the first network node supports the serving cell and supports at least one of distributed unit (DU) functionality or a layer 2 protocol of a radio access network; receive, from a second network node supporting at least one of central unit control plane (CU-CP) functionality or a layer 3 protocol of the radio access network, a radio resource control (RRC) message that includes configuration information relating to timing advance, where the configuration information is configured to prepare the user equipment apparatus (UE) for at least one candidate target cell with which the UE may connect, where the RRC message is received prior to the UE connecting with any of the at least one candidate target cell; and implement a configuration based on the configuration information.

In an aspect of the user equipment apparatus, the configuration information relating to timing advance may relate to at least one of: timing advance measurement, timing advance acquisition resource, timing advance trigger, time alignment timer, timing advance update, or timing advance reporting.

In an aspect of the user equipment apparatus, the RRC message may be configured to prepare the UE for at least one of: a handover, carrier aggregation, multiple transmission and reception points, dual connectivity, fast handover, or dynamic point switching.

In an aspect of the user equipment apparatus, the configuration information is for L1/L2 triggered mobility (LTM). The instructions, when executed by the at least one processor, may further cause the user equipment apparatus at least to, prior to receiving a cell switch command from the first network node: select a set of candidate target cells, and initiate timing advance acquisition for the set of candidate target cells to acquire timing advance values for the set of candidate target cells.

In an aspect of the user equipment apparatus, the set of candidate target cells may be selected based on at least one of: measurement quality above a predefined value, measurement quality above a threshold with respect to the serving cell for a predefined time duration, or measurement quality above a threshold with respect to the serving cell for a predefined number of samples.

In an aspect of the user equipment apparatus, the instructions, when executed by the at least one processor, may further cause the user equipment apparatus at least to: perform at least one of: receive, from the first network node, additional configuration indicating whether to maintain the timing advance values, acquired for the set of candidate target cells before a cell switch, during or after the cell switch; receive, from the first network node, additional configuration indicating whether to maintain a subset of the timing advance values during or after the cell switch, where the subset of timing advance values correspond to a subset of the set of candidate target cells which have at least one of: measurement quality above a predefined value, measurement quality above a threshold with respect to the serving cell for a predefined time duration, measurement quality above a threshold with respect to the serving cell for a predefined number of samples, measurement quality above a threshold with respect to a cell, of the set of candidate target cells, for a predefined time duration, measurement quality above a threshold with respect to a cell, of the set of candidate target cells, for a predefined number of samples; or receive, from the first network node, additional configuration indicating whether to expire any running time alignment timers upon the cell switch.

In an aspect of the user equipment apparatus, the instructions, when executed by the at least one processor, may further cause the user equipment apparatus at least to: receive, from the first network node, additional configuration information relating to reacquiring timing advance when time alignment timers expire during at least one of: after receiving the cell switch command in connection with the LTM, during a cell switching procedure after receiving the cell switch command, or during a predefined time duration after switching to a target cell.

In an aspect of the user equipment apparatus, the instructions, when executed by the at least one processor, may further cause the user equipment apparatus at least to: implement a second configuration based on the additional configuration information. The second configuration may indicate at least one of: not to reacquire timing advance for a candidate target cell among the set of candidate target cells if the candidate target cell has at least one of: measurement quality below a predefined value, measurement quality below a threshold with respect to the serving cell, or measurement quality below a threshold with respect to at least one other candidate target cell among the set of candidate target cells, not to reacquire timing advance for the candidate target cell, use a different method to reacquire timing advance, restart the time alignment timers, or use new time alignment timers.

In an aspect of the user equipment apparatus, the instructions, when executed by the at least one processor, may further cause the user equipment apparatus at least to: receive, from the first network node, a LTM trigger command to trigger a cell switch. The LTM trigger command may include at least one of: an indication of whether to expire any running time alignment timers upon the cell switch; an indication of whether to maintain the timing advances, acquired for the set of candidate target cells before the cell switch, during or after the cell switch; an indication of whether to maintain and report the timing advances, acquired for the set of candidate target cells before the cell switch, during or after the cell switch; an indication of whether to maintain and report cell IDs for the set of candidate target cells during or after the cell switch; an indication of whether to maintain and report the cell IDs and the timing advances during or after the cell switch; or an indication of whether to maintain and report the cell ID and the timing advance for a target cell of the set of candidate target cells if a time alignment timer for the target cell is running and will not expire within a predefined time duration during or after the cell switch.

In an aspect of the user equipment apparatus, the instructions, when executed by the at least one processor, may further cause the user equipment apparatus at least to: receive, from one of the first network node or a third network node which supports at least one of DU functionality or a layer 2 protocol of a radio access network, additional configuration information for transmitting a timing advance report; and transmit, towards one of the first network node or the third network node, the timing advance report.

In an aspect of the user equipment apparatus, the additional configuration information may indicate inclusion, in the timing advance report, of at least one of: timing advance group ID, physical cell IDs (PCI) of a timing advance group (TAG), transmission configuration index states (TCI-state) of a TAG, TCI-state IDs of a TAG, timing advance value associated with a TAG, time alignment timer status associated with a TAG, timing advance acquisition method and UE preference for timing advance acquisition, or UE capabilities for timing advance acquisition, where the UE capabilities include at least one of: number of TAGs, number of cells, method for acquiring timing advance, or timing advance update limitations.

In an aspect of the user equipment apparatus, the third network node supports a target cell. Prior to a cell switch to the target cell, the additional configuration information is received from the first network node, where the additional configuration information includes uplink resources allocated by the third network node. After the cell switch, the timing advance report is transmitted towards the third network node using the uplink resources.

In an aspect of the user equipment apparatus, the third network node supports a target cell. After a cell switch to the target cell, the additional configuration information is received from the third network node as part of a request for the timing advance report. After the cell switch, the timing advance report is transmitted towards the third network node in response to the request for the timing advance report.

In an aspect of the user equipment apparatus, the third network node supports a target cell, and during at least one of prior to a cell switch to the target cell or during the cell switch to the target cell, the timing advance report is transmitted towards the first network node.

In an aspect of the user equipment apparatus, the third network node supports a target cell. The instructions, when executed by the at least one processor, may further cause the user equipment apparatus at least to: receive, from the third network node, after a cell switch to the target cell, updated configuration information that includes at least one of: an indication of whether to maintain timing advance values for at least one cell of the set of candidate target cells, an indication to add a cell to a timing advance group, an indication to add a transmission configuration index state (TCI-state) to a timing advance group, an indication to remove a cell from a timing advance group, an indication to remove a TCI-state from a timing advance group, an indication to configure a new timing advance group, a time alignment timer configuration, or configurations on a method for acquiring timing advance after time alignment timer expiry.

In accordance with aspects of the present disclosure, a processor-implemented method in a user equipment apparatus includes: establishing a connection with a first network node via a serving cell, where the first network node supports the serving cell and supports at least one of distributed unit (DU) functionality or a layer 2 protocol of a radio access network; receiving, from a second network node supporting at least one of central unit control plane (CU-CP) functionality or a layer 3 protocol of the radio access network, a radio resource control (RRC) message that includes configuration information relating to timing advance, where the configuration information is configured to prepare the user equipment apparatus (UE) for at least one candidate target cell with which the UE may connect, where the RRC message is received prior to the UE connecting with any of the at least one candidate target cell; and implementing a configuration based on the configuration information.

In an aspect of the processor-implemented method, the configuration information relating to timing advance may relate to at least one of: timing advance measurement, timing advance acquisition resource, timing advance trigger, time alignment timer, timing advance update, or timing advance reporting.

In an aspect of the processor-implemented method, the RRC message may be configured to prepare the UE for at least one of: a handover, carrier aggregation, multiple transmission and reception points, dual connectivity, fast handover, or dynamic point switching.

In an aspect of the processor-implemented method, the configuration information may be for L1/L2 triggered mobility (LTM). The processor-implemented method may further include, prior to receiving a cell switch command from the first network node: selecting a set of candidate target cells, and initiating timing advance acquisition for the set of candidate target cells to acquire timing advance values for the set of candidate target cells.

In an aspect of the processor-implemented method, the set of candidate target cells may be selected based on at least one of: measurement quality above a predefined value, measurement quality above a threshold with respect to the serving cell for a predefined time duration, or measurement quality above a threshold with respect to the serving cell for a predefined number of samples.

In an aspect of the processor-implemented method, the processor-implemented method may further include: performing at least one of: receiving, from the first network node, additional configuration indicating whether to maintain the timing advance values, acquired for the set of candidate target cells before a cell switch, during or after the cell switch;

receiving, from the first network node, additional configuration indicating whether to maintain a subset of the timing advance values during or after the cell switch, the subset of timing advance values corresponding to a subset of the set of candidate target cells which have at least one of: measurement quality above a predefined value, measurement quality above a threshold with respect to the serving cell for a predefined time duration, measurement quality above a threshold with respect to the serving cell for a predefined number of samples, measurement quality above a threshold with respect to a cell, of the set of candidate target cells, for a predefined time duration, measurement quality above a threshold with respect to a cell, of the set of candidate target cells, for a predefined number of samples; or receiving, from the first network node, additional configuration indicating whether to expire any running time alignment timers upon the cell switch.

In an aspect of the processor-implemented method, the processor-implemented method may further include: receiving, from the first network node, additional configuration information relating to reacquiring timing advance when time alignment timers expire during at least one of: after receiving the cell switch command in connection with the LTM, during a cell switching procedure after receiving the cell switch command, or during a predefined time duration after switching to a target cell.

In an aspect of the processor-implemented method, the processor-implemented method may further include: implementing a second configuration based on the additional configuration information. The second configuration may indicate at least one of: not to reacquire timing advance for a candidate target cell among the set of candidate target cells if the candidate target cell has at least one of: measurement quality below a predefined value, measurement quality below a threshold with respect to the serving cell, or measurement quality below a threshold with respect to at least one other candidate target cell among the set of candidate target cells, not to reacquire timing advance for the candidate target cell, use a different method to reacquire timing advance, restart the time alignment timers, or use new time alignment timers.

In an aspect of the processor-implemented method, the processor-implemented method may further include: receiving, from the first network node, a LTM trigger command to trigger a cell switch. The LTM trigger command may include at least one of: an indication of whether to expire any running time alignment timers upon the cell switch; an indication of whether to maintain the timing advances, acquired for the set of candidate target cells before the cell switch, during or after the cell switch; an indication of whether to maintain and report the timing advances, acquired for the set of candidate target cells before the cell switch, during or after the cell switch; an indication of whether to maintain and report cell IDs for the set of candidate target cells during or after the cell switch; an indication of whether to maintain and report the cell IDs and the timing advances during or after the cell switch; or an indication of whether to maintain and report the cell ID and the timing advance for a target cell of the set of candidate target cells if a time alignment timer for the target cell is running and will not expire within a predefined time duration during or after the cell switch.

In an aspect of the processor-implemented method, the processor-implemented method may further include: receiving, from one of the first network node or a third network node which supports at least one of DU functionality or a layer 2 protocol of a radio access network, additional configuration information for transmitting a timing advance report; and transmitting, towards one of the first network node or the third network node, the timing advance report.

In an aspect of the processor-implemented method, the additional configuration information may indicate inclusion, in the timing advance report, of at least one of: physical cell IDs (PCI) of a timing advance group (TAG), transmission configuration index states of a TAG, timing advance value associated with a TAG, time alignment timer status associated with a TAG, timing advance acquisition method and UE preference for timing advance acquisition, or UE capabilities for timing advance acquisition, the UE capabilities comprising at least one of: number of TAGs, number of cells, method for acquiring timing advance, or timing advance update limitations.

In an aspect of the processor-implemented method, the third network node supports a target cell. Prior to a cell switch to the target cell, the additional configuration information is received from the first network node, where the additional configuration information includes uplink resources allocated by the third network node. After the cell switch, the timing advance report is transmitted towards the third network node using the uplink resources.

In an aspect of the processor-implemented method, the third network node supports a target cell. After a cell switch to the target cell, the additional configuration information is received from the third network node as part of a request for the timing advance report. After the cell switch, the timing advance report is transmitted towards the third network node in response to the request for the timing advance report.

In an aspect of the processor-implemented method, the third network node supports a target cell. During at least one of prior to a cell switch to the target cell or during the cell switch to the target cell, the timing advance report is transmitted towards the first network node.

In an aspect of the processor-implemented method, the third network node supports a target cell. The processor-implemented method may further include: receiving, from the third network node, after a cell switch to the target cell, updated configuration information that includes at least one of: an indication of whether to maintain timing advance values for at least one cell of the set of candidate target cells, an indication to add a cell to a timing advance group, an indication to remove a cell from a timing advance group, an indication to configure a new timing advance group, a time alignment timer configuration, or configurations on a method for acquiring timing advance after time alignment timer expiry.

According to some aspects, there is provided the subject matter of the independent claims. Some further aspects are defined in the dependent claims.

BRIEF DESCRIPTION OF THE DRAWINGS

Some example embodiments will now be described with reference to the accompanying drawings.

DETAILED DESCRIPTION

In the following description, certain specific details are set forth in order to provide a thorough understanding of disclosed aspects. However, one skilled in the relevant art will recognize that aspects may be practiced without one or more of these specific details or with other methods, components, materials, etc. In other instances, well-known structures associated with transmitters, receivers, or transceivers have not been shown or described in detail to avoid unnecessarily obscuring descriptions of the aspects.

Reference throughout this specification to "one aspect" or "an aspect" means that a particular feature, structure, or characteristic described in connection with the aspect is included in at least one aspect. Thus, the appearances of the phrases "in one aspect" or "in an aspect" in various places throughout this specification are not necessarily all referring to the same aspect. Furthermore, the particular features, structures, or characteristics may be combined in any suitable manner in one or more aspects.

Aspects or embodiments described in the present disclosure may be implemented in wireless networking apparatuses, such as, without limitation, apparatuses utilizing Worldwide Interoperability for Microwave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), Long Term Evolution (LTE), LTE-Advanced, enhanced LTE (eLTE), 5G New Radio (5G NR), and 802.11ax (Wi-Fi 6), among other wireless networking systems. The term 'eLTE' here denotes the LTE evolution that connects to a 5G core. LTE is also known as evolved UMTS terrestrial radio access (EUTRA) or as evolved UMTS terrestrial radio access network (EUTRAN).

Aspects of the present disclosure relate to timing advance management in 5G NR. Aspects of the present disclosure provide various advantages, including, for example, better efficiency during and after a handover using L1/L2 triggered mobility (LTM).

As used herein, the terms "transmit towards", "receive from", "cooperate with", and "coordinate with" (and their variations), include communications that may or may not involve communications through one or more intermediate devices or nodes. The term "acquire" (and its variations) includes acquiring in the first instance or reacquiring after the first instance. The term "connection" may mean a physical connection or a logical connection.

Figure 1:
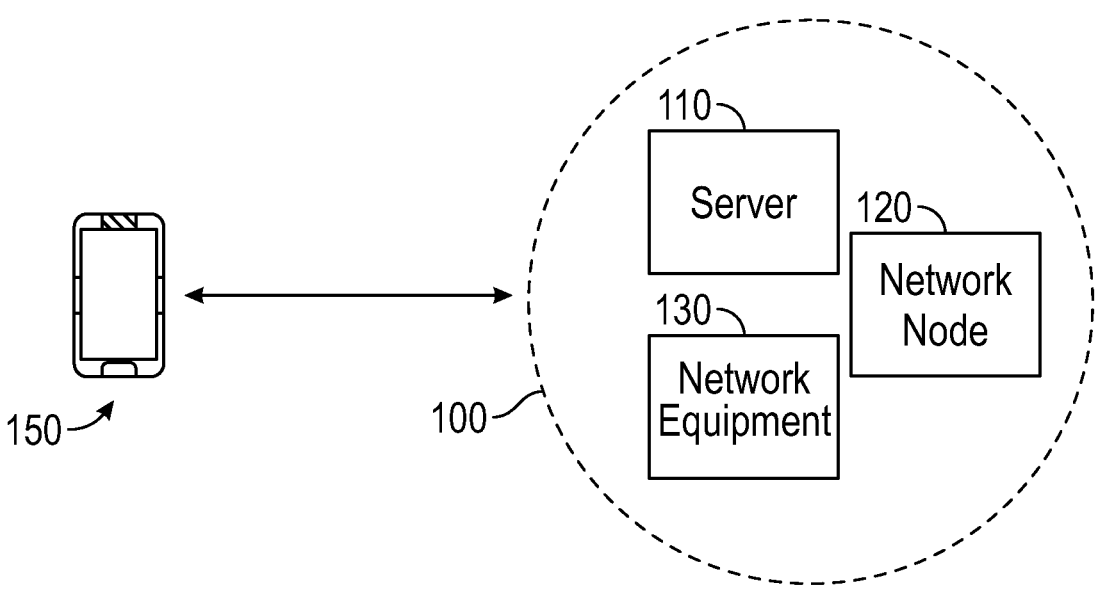
FIG. 1 is a diagram of an example embodiment of wireless networking between a network system and a user equipment apparatus (UE), according to one illustrated aspect of the disclosure.

FIG. 1 is a diagram depicting an example of wireless networking between a network system 100 and a user equipment apparatus (UE) 150. The network system 100, for example, may include one or more network nodes 120, one or more servers 110, and/or one or more network equipment 130 (e.g., test equipment). The network nodes 120 will be described in more detail below. As used herein, the term "network apparatus" may refer to any component of the network system 100, such as the server 110, the network node 120, the network equipment 130, any component(s) of the foregoing, and/or any other component(s) of the network system 100. Examples of network apparatuses include, without limitation, apparatuses implementing 5G NR and apparatuses implementing Wi-Fi 6, among others. The present disclosure describes embodiments related to 5G NR and embodiments that involve aspects defined by 3rd Generation Partnership Project (3GPP). However, it is contemplated that embodiments relating to other wireless networking technologies are encompassed within the scope of the present disclosure.

The following description provides further details of examples of network nodes. In a 5G NR network, a gNodeB (also known as gNB) may include, e.g., a node that provides NR user plane and control plane protocol terminations towards the UE and that is connected via a NG interface to the 5G core (5GC), e.g., according to 3GPP TS 38.300 V16.6.0 (2021-06) section 3.2, which is hereby incorporated by reference herein.

A gNB supports various protocol layers, e.g., Layer 1 (L1)—physical layer, Layer 2 (L2), and Layer 3 (L3).

The layer 2 (L2) of NR is split into the following sublayers: Medium Access Control (MAC), Radio Link Control (RLC), Packet Data Convergence Protocol (PDCP) and Service Data Adaptation Protocol (SDAP), where, e.g.:

The physical layer offers to the MAC sublayer transport channels;

The MAC sublayer offers to the RLC sublayer logical channels;

The RLC sublayer offers to the PDCP sublayer RLC channels;

The PDCP sublayer offers to the SDAP sublayer radio bearers;

The SDAP sublayer offers to 5GC quality of service (QoS) flows;

"Comp." refers to header compression and "Segm." Refers to segmentation;

Control channels include broadcast control channel (BCCH) and physical control channel (PCCH).

Layer 3 (L3) includes e.g., radio resource control (RRC), e.g., according to 3GPP TS 38.300 V16.6.0 (2021-06) section 6, which is hereby incorporated by reference herein.

A gNB central unit (gNB-CU) includes, e.g., a logical node hosting, e.g., radio resource control (RRC), service data adaptation protocol (SDAP), and packet data convergence protocol (PDCP) protocols of the gNB or RRC and PDCP protocols of the en-gNB, that controls the operation of one or more gNB distributed units (gNB-DUs). The gNB-CU terminates the F1 interface connected with the gNB-DU. A gNB-CU may also be referred to herein as a CU, a central unit, a centralized unit, or a control unit.

A gNB Distributed Unit (gNB-DU) includes, e.g., a logical node hosting, e.g., radio link control (RLC), media access control (MAC), and physical (PHY) layers of the gNB or en-gNB, and its operation is partly controlled by the gNB-CU. One gNB-DU supports one or multiple cells. One cell is supported by only one gNB-DU. The gNB-DU terminates the F1 interface connected with the gNB-CU. A gNB-DU may also be referred to herein as DU or a distributed unit.

A gNB-CU-Control Plane (gNB-CU-CP) includes, e.g., a logical node hosting, e.g., the RRC and the control plane part of the PDCP protocol of the gNB-CU for an en-gNB or a gNB. The gNB-CU-CP terminates the E1 interface connected with the gNB-CU-User Plane (gNB-CU-UP) and the F1-C interface connected with the gNB-DU.

A gNB-CU-User Plane (gNB-CU-UP) includes, e.g., a logical node hosting, e.g., the user plane part of the PDCP protocol of the gNB-CU for an en-gNB, and the user plane part of the PDCP protocol and the SDAP protocol of the gNB-CU for a gNB. The gNB-CU-UP terminates the E1 interface connected with the gNB-CU-CP and the F1-U interface connected with the gNB-DU, e.g., according to 3GPP TS 38.401 V16.6.0 (2021-07) section 3.1, which is hereby incorporated by reference herein.

Different functional splits between the central and distributed unit are possible, e.g., called options:

Option 1 (1A-like split):

The function split in this option is similar to the 1A architecture in dual connectivity (DC). RRC is in the central unit. PDCP, RLC, MAC, physical layer, and RF are in the distributed unit.

Option 2 (3C-like split):

The function split in this option is similar to the 3C architecture in DC. RRC and PDCP are in the central unit. RLC, MAC, physical layer, and RF are in the distributed unit.

Option 3 (intra RLC split):

Low RLC (partial function of RLC), MAC, physical layer, and RF are in the distributed unit. PDCP and high RLC (the other partial function of RLC) are in the central unit.

Option 4 (RLC-MAC split):

MAC, physical layer, and RF are in the distributed unit. PDCP and RLC are in the central unit.

Or else, e.g., according to 3GPP TR 38.801 V14.0.0 (2017-03) section 11, which is incorporated by reference herein.

As used herein, the term "network node" may refer to any of a gNB, a gNB-CU, a gNB-DU, a gNB-CU-CP, or a gNB-CU-UP, or any combination of them.

A RAN (radio access network) node or network node such as, e.g. a gNB, base station, gNB-CU, or gNB-DU, or parts thereof, may be implemented using, e.g., an apparatus with at least one processor and/or at least one memory with processor-readable instructions ("program") configured to support and/or provision and/or process CU and/or DU related functionality and/or features, and/or at least one protocol (sub-) layer of a RAN (radio access network), e.g. layer 2 and/or layer 3. An example of such an apparatus and components will be described in connection with FIG. 2 below.

The gNB-CU and gNB-DU parts may, e.g., be co-located or physically separated. The gNB-DU may even be split further, e.g., into two parts, e.g., one including processing equipment and one including an antenna. A central unit (CU) may also be called BBU/REC/RCC/C-RAN/V-RAN, 0-RAN, or part thereof. A distributed unit (DU) may also be called RRH/RRU/RE/RU, or part thereof. Hereinafter, in various example embodiments of the present disclosure, a network node, which supports at least one of central unit control plane functionality or a layer 3 protocol of a radio access network, may be, e.g., a gNB-CU-CP. Similarly, a network node, which supports at least one of distributed unit functionality or a layer 2 protocol of the radio access network, may be, e.g., a gNB-DU.

A gNB-CU may support one or multiple gNB-DUs. A gNB-DU may support one or multiple cells and, thus, could support a serving cell for a user equipment apparatus (UE) or support a candidate cell for handover, dual connectivity, and/or carrier aggregation, among other procedures. Examples of such procedures will be described below in connection with FIG. 3 and FIG. 4.

The user equipment apparatus (UE) 150 may be or include a wireless or mobile device, an apparatus with a radio interface to interact with a RAN (radio access network), a smartphone, an in-vehicle apparatus, an IoT device, or a M2M device, among other types of user equipment. Such UE 150 may include: at least one processor; and at least one memory including program code; where the at least one memory and the computer program code are configured to, with the at least one processor, cause the apparatus at least to perform certain operations, such as, e.g., RRC connection to the RAN. An example of components of a UE will be described in connection with FIG. 2. In embodiments, the UE 150 may be configured to generate a message (e.g., including a cell ID) to be transmitted via radio towards a RAN (e.g., to reach and communicate with a serving cell). In embodiments, the UE 150 may generate and transmit and receive RRC messages containing one or more RRC PDUs (packet data units). Persons skilled in the art will understand RRC protocol as well as other procedures a UE may perform.

With continuing reference to FIG. 1, in the example of a 5G NR network, the network system 100 provides a cell, which defines a coverage area of the network system 100. As described above, the network system 100 may include a gNB of a 5G NR network or may include any other apparatus configured to control radio communication and manage radio resources within a cell. As used herein, the term "resource" may refer to radio resources, such as a resource block (RB), a physical resource block (PRB), a radio frame, a subframe, a time slot, a sub-band, a frequency region, a sub-carrier, a beam, etc. In embodiments, the network node 120 may be called a base station.

FIG. 1 provides an example and is merely illustrative of a network system 100 and a UE 150. Persons skilled in the art will understand that the network system 100 includes components not illustrated in FIG. 1 and will understand that other user equipment apparatuses may be in communication with the network system 100.

Figure 2:
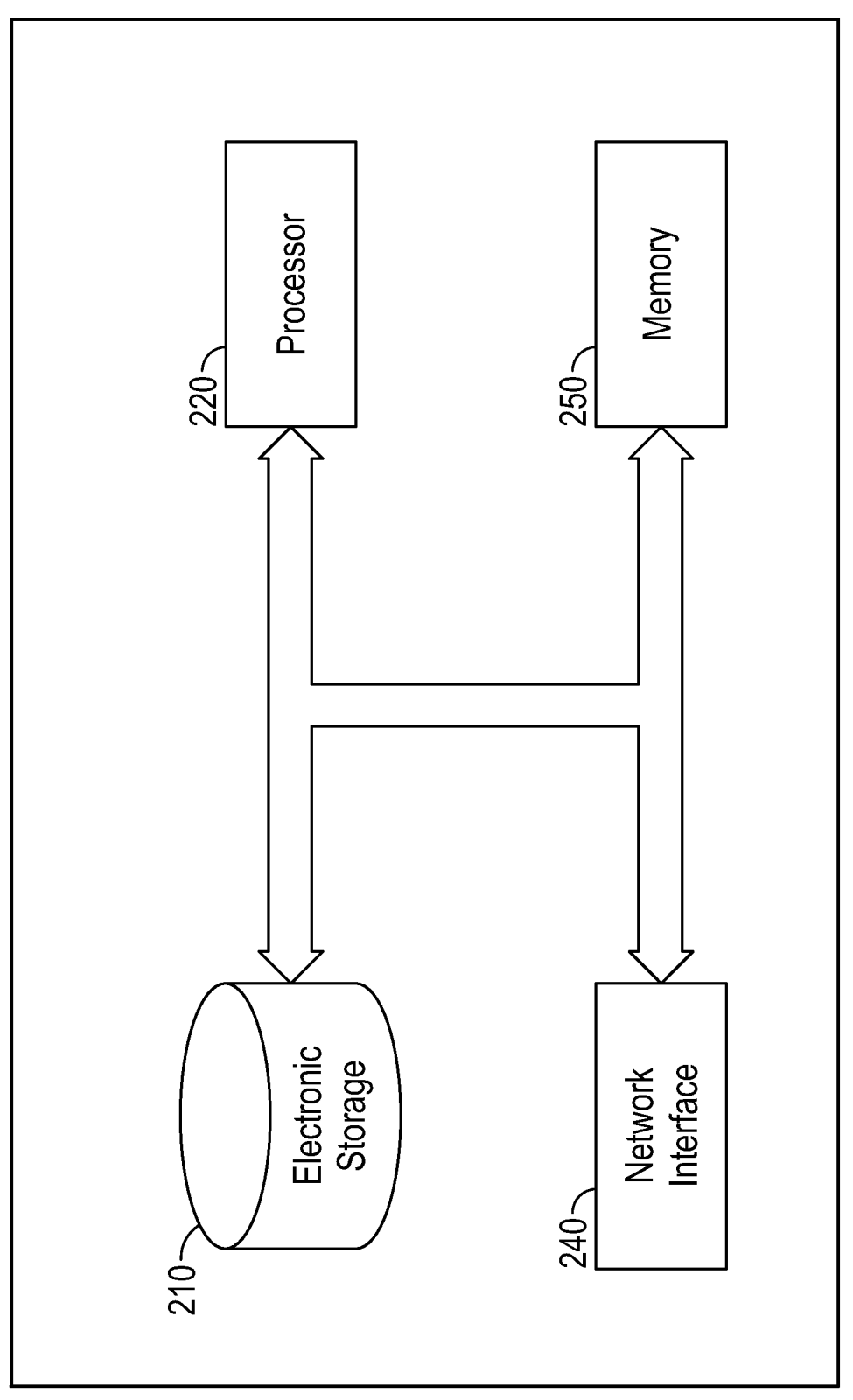
FIG. 2 is a diagram of an example embodiment of components of an apparatus, according to one illustrated aspect of the disclosure.

Referring now to FIG. 2, there is shown a block diagram of example components of a UE or a network apparatus. The apparatus includes an electronic storage 210, a processor 220, a memory 250, and a network interface 240. The various components may be communicatively coupled with each other. The processor 220 may be and may include any type of processor, such as a single-core central processing unit (CPU), a multi-core CPU, a microprocessor, a digital signal processor (DSP), a System-on-Chip (SoC), or any other type of processor. The memory 250 may be a volatile type of memory, e.g., RAM, or a non-volatile type of memory, e.g., NAND flash memory. The memory 250 includes processor-readable instructions that are executable by the processor 220 to cause the apparatus to perform various operations, including those mentioned herein.

The electronic storage 210 may be and include any type of electronic storage used for storing data, such as hard disk drive, solid state drive, and/or optical disc, among other types of electronic storage. The electronic storage 210 stores processor-readable instructions for causing the apparatus to perform its operations and stores data associated with such operations, such as storing data relating to 5G NR standards, among other data. The network interface 240 may implement wireless networking technologies such as 5G NR, Wi-Fi 6, and/or other wireless networking technologies.

The components shown in FIG. 2 are merely examples, and persons skilled in the art will understand that an apparatus includes other components not illustrated and may include multiples of any of the illustrated components. Such and other embodiments are contemplated to be within the scope of the present disclosure.

Figure 3:
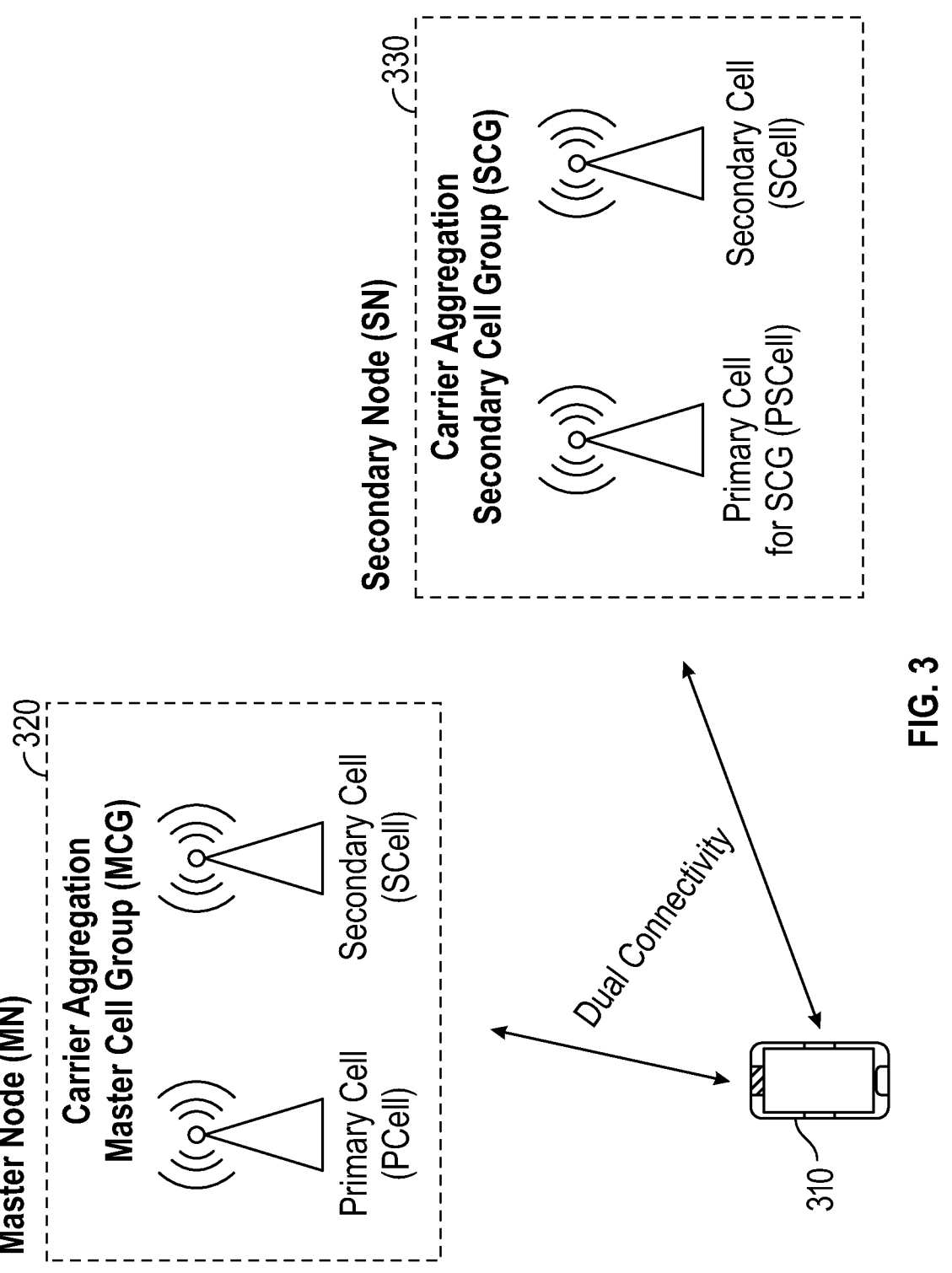
FIG. 3 is a diagram of an example embodiment of dual connectivity (DC) and carrier aggregation (CA), according to one illustrated aspect of the disclosure.

FIG. 3 is a diagram depicting an example of dual connectivity (DC) and carrier aggregation (CA). Dual connectivity allows a UE 310 to simultaneously connect to two network nodes, which may be referred to as a master node (MN) 320 and a secondary node (SN) 330. In embodiments, the MN 320 and/or the SN 330 may be a 5G New Radio (NR) node (e.g., gNB), among other types of nodes. In embodiments, the MN 320 and/or SN 330 may be base stations.

In embodiments, the MN 320 connects to a core network, such as a 5G core (5GC), and provides a control plane connection between a UE 310 and the core network, while the SN 330 connects to the MN 320 (e.g., via an Xn interface) and provides additional resources for user plane traffic. In embodiments, the MN 320 handles signaling messages, such as radio resource control (RRC) signaling messages. In embodiments, using signaling radio bearers (SRB) for 5G NR networks (e.g., SRB3), the SN 330 may handle signaling messages, such as RRC signaling messages, as well. Persons skilled in the art will understand RRC and SRB.

Carrier aggregation is illustrated in FIG. 3. While FIG. 3 shows carrier aggregation in conjunction with dual connectivity, carrier aggregation may be used without dual connectivity, as well. Carrier aggregation enables a UE 410 to simultaneously connect with multiple cells so as to operate at multiple frequencies at the same time. In embodiments, the multiple cells may be located at a single base station and/or at a common location (e.g., small cells or femtocells at a facility), among other possibilities. One or more cells that may be usable by a UE under carrier aggregation may be referred to as a "cell group." When carrier aggregation is used with dual connectivity, the master node and/or the secondary node may have a cell group. A cell group of a master node may be referred to as a master cell group (MCG), and a cell group of a secondary node may be referred to as a secondary cell group (SCG). As shown in FIG. 3, the MCG includes a primary cell (Pcell) and may include one or more secondary cells (Scell). The SCG includes a primary cell of a secondary cell group (PSCell) and may include one or more secondary cells (Scell). Persons skilled in the art will understand the characteristics and functions of such cells and cell groups.

The example of FIG. 3 is merely illustrative of dual connectivity and carrier aggregation. The descriptions below may refer to dual connectivity and/or carrier aggregation. For example, in relation setting up dual connectivity, a cell which is a candidate for a PSCell may be referred to as a target cell, a candidate cell, or a target candidate cell, which may be used interchangeably. As another example, in relation to carrier aggregation, a cell which is a candidate for a Scell may also be referred to as a target cell, a candidate cell, or a target candidate cell. It will be understood that such references are not limited to the example illustrated in FIG. 3. Other arrangements different from FIG. 3 are contemplated to be within the scope of the present disclosure.

Figure 4:
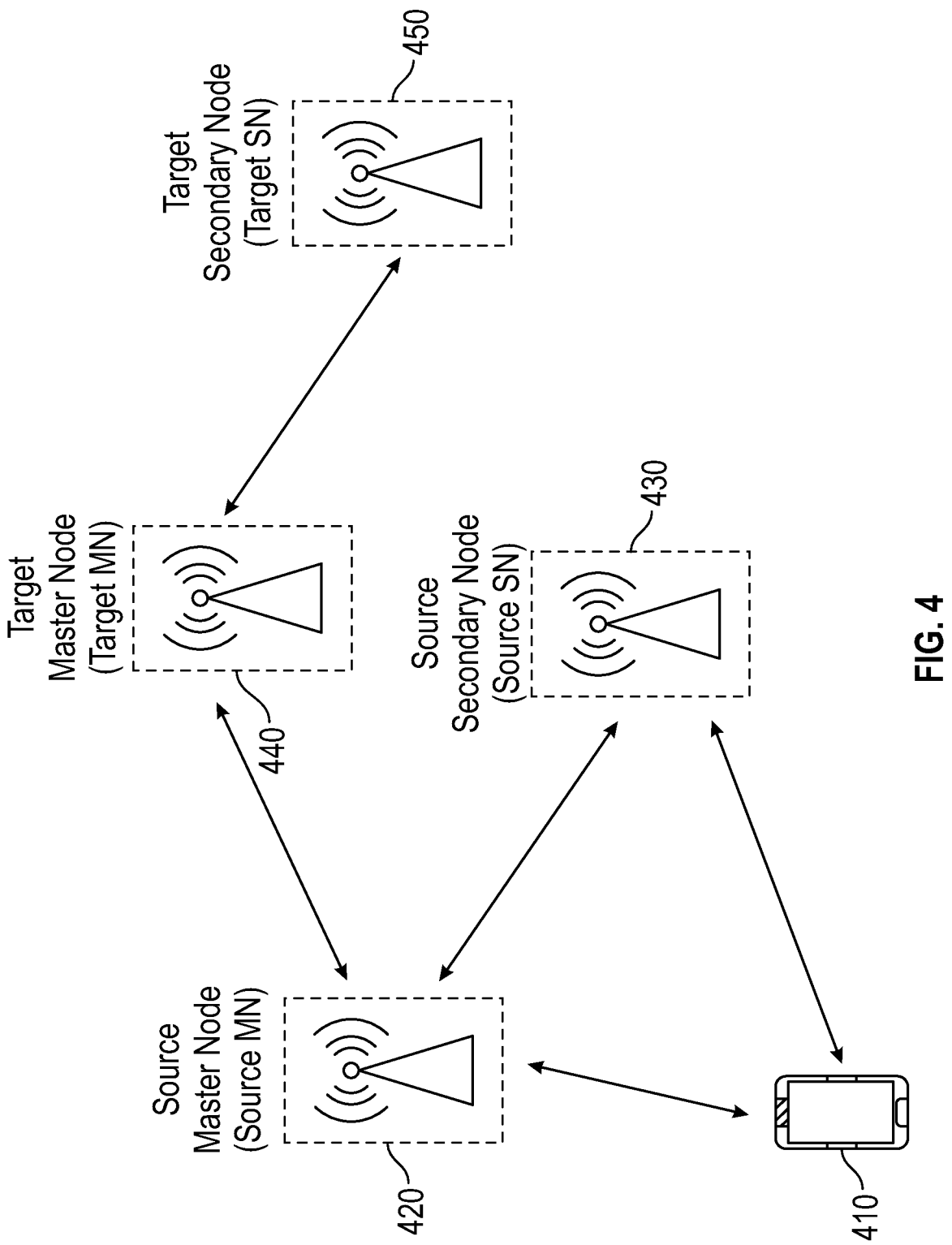
FIG. 4 is a diagram of an example embodiment of a handover procedure, according to one illustrated aspect of the disclosure.

FIG. 4 depicts an example of a handover scenario. Handover (HO) refers to a procedure that transitions the servicing of a UE from a source node and/or cell to a target node and/or cell. Handover may be performed, for example, when a UE transits between cells, among other scenarios. FIG. 4 shows a UE 410, a source MN 420, a source SN 430, a target MN 440, and a target SN 450.

The standards of 5G 3GPP (3$^{rd}$ Generation Partnership Project) Releases 15, 16, and 17 enhanced handover operations in various ways. Further enhancements are being developed under the term Layer 1/Layer 2 triggered mobility (LTM), which may also be referred to as L1/L2 triggered mobility, L1/2 inter-cell mobility, L1/2 handover, or lower layer (L1/2) mobility. These terms may be used interchangeably. A L1/L2 signal, message, or command sent by a network node to trigger a cell switch at the UE is referred as a "cell switch command." In LTM, the decision about a cell switch is based on L1 measurements and is made in the MAC layer in a distributed unit (DU). A cell switch command includes a MAC control element (MAC CE). The cell that is the target of a handover may be referred to herein as a target cell, a candidate cell, or a target candidate cell, which may be used interchangeably.

In the case of dual connectivity, a handover may involve a handover from a source MN 420 to a target MN 440, a handover from a source SN 430 to a target SN 450, a change of Pcell within a MN, and/or a change of PSCell within a SN. In the case of dual connectivity, a handover to a target MN 440 may involve coordination with a target SN 450, as well. Specific standards that may be relevant include, without limitation, 3GPP TS 37.340 and TS 38.423.

The example of a handover depicted in FIG. 4 is merely illustrative. Variations are contemplated to be within the scope of the present disclosure.

FIG. 3 and FIG. 4 illustrate examples of operations and functionality that involve multiple network nodes and/or cells. Other operations and functionality may involve multiple nodes and/or cells, as well, such as multiple transmission and reception point (mTRP), fast handover, and dynamic point switching, among others. Such operations may involve a UE communicating with a target DU supporting a candidate target cell. A procedure for a UE to establish communications with a target DU is referred to as random access procedure. Random access procedure may be used for initial access, small data transmissions in inactive and transition from RRC Inactive to RRC Connected, as well as in beam failure recovery, connection re-establishment, handover, and cell addition, among other procedures which persons skilled in the art will recognize.

Figure 5:
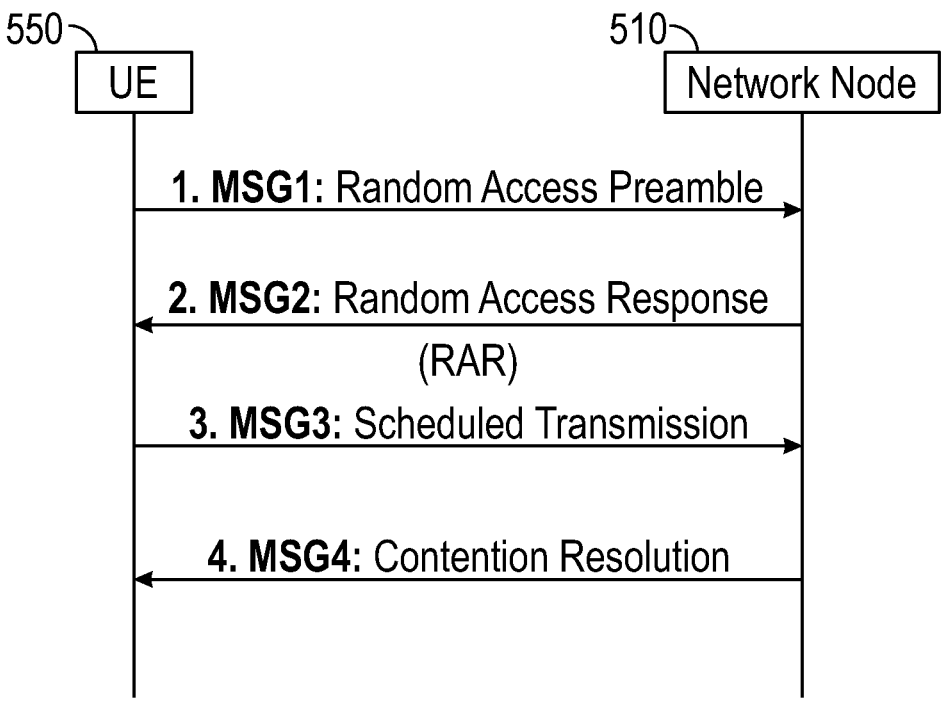
FIG. 5 is a diagram of an example embodiment of a contention-based random access procedure, according to one illustrated aspect of the disclosure.

Two types of random access procedures include contention-based random access (CBRA) and contention-free random access (CFRA). FIG. 5 is a diagram of an example of a contention-based random access (CBRA) procedure. In the illustrated example, the signals include a random access preamble (MSG1) transmitted by the UE 550 towards the network node 510, a random access response (MSG2) transmitted from the network node 510 towards the UE 550, a schedule transmission (MSG3) transmitted from the UE 550 towards the network node 510, and a contention resolution (MSG4) transmitted from the network node 510 towards the UE 550.

For MSG1, the UE 550 selects a usable random access preamble based on information elements in a signal synchronization block (SSB), which persons skilled in the art will understand. The UE 550 sends the random access preamble (MSG1) towards the network node 510 using a specific time and frequency resource known as random access occasion (RO). The UE 550 also provides an identity, called random access radio network temporary identity (RA-RNTI), to the network so that the network can address it in the next step.

For MSG2, the network node 110 detects the preamble, calculates various quantities, and sends a physical uplink shared channel (PUSCH) uplink (UL) grant towards the UE 550. This is called the random access response (RAR), which is sent as MSG2 addressed to the UE 550 with the relevant RA-RNTI and indicates to the UE 550 where in frequency and when in time it can transmit MSG3 on the PUSCH.

For MSG3, in response to receiving the MSG2 from the network node 510, the UE 550 sends MSG3 using the UL grant provided in the RAR. Because the RAR provides a time resource allocation, the UE 550 sends MSG3 towards the network node 510 at a timing specified by the time resource allocation and is a scheduled transmission. This MSG3 may be called a radio resource control (RRC) connection request message.

For MSG4, the network node 510 may send MSG4 towards the UE 550 for contention resolution. Contention resolution may operate in the manner specified by 3GPP for 5G NR. After the random access procedure, assuming contention resolution is resolved favorably, the UE 550 becomes connected to the network node 510. After establishing a connection, various procedures would be handled by a gNB-CU in accordance with the CU-DU split, such as the example splits described above. Other aspects of contention-based random access (CBRA) will be understood by persons skilled in the art.

Another type of random access procedure is contention-free random access (CFRA) (not shown). In general, for CFRA, the network node 510 provides a configuration that specifies one or more allocated random access preamble indices and random access occasions for each signal synchronization block (SSB). The network node 510 transmits the CFRA configuration, such as preamble index and random access occasion, towards the UE 550. The UE 550 receives the CFRA configuration and sends the random access preamble to the network node 510 in a random access request as MSG1. Then, MSG2 and MSG3 are similar to those described in connection with CBRA. No conflict resolution is needed in CFRA based on use of an allocated random access preamble. Other aspects of contention-free random access (CFRA) will be understood by persons skilled in the art.

In accordance with aspects of the present application, the present disclosure relates to timing advance (TA) management with respect to candidate target cells, which may be targets of handover, dual connectivity, carrier aggregation, mTRP, fast handover and/or dynamic point switching, among other procedures. Timing advance refers to information used by a UE to time its uplink transmissions towards a network node to arrive at the network node in alignment with a reception time window. This information may be referred to herein as a timing advance value or TA value, and the process of acquiring a timing advance value may be referred to herein as timing advance acquisition, TA acquisition, acquiring timing advance, or acquiring TA (or variations thereof). As described above herein, the term "acquire" (and its variations) includes acquiring in the first instance or reacquiring after the first instance. A UE that has longer propagation delay to a network node may have a larger TA value than a UE that has shorter propagation delay to the network node.

In embodiments, a UE may acquire a separate TA value for each candidate target cell. The TA value for a candidate target cell may be determined based on information provided by a DU supporting the candidate target cell, for example, in a MAC control element (MAC CE) or in a random access response (RAR).

In embodiments, a UE may acquire a TA value for a timing advance group (TAG). A timing advance group (TAG) is a group of serving cells that is configured by RRC and that, for the cells with a UL configured, use the same timing reference cell and the same timing advance value. A TAG containing a SpCell (which is a Pcell+PSCell) of a MAC entity is referred to as a primary timing advance group (PTAG), whereas the term secondary timing advance group (STAG) refers to TAGs that do not include a SpCell.

Each TAG may include a time alignment timer (TAT), which controls how long a MAC entity considers the serving cells belonging to the associated TAG to be uplink time-aligned. A TAT may also be referred to as timeAlignment-Timer. Procedures for maintenance of uplink time alignment may involve 3GPP Specification 38.331, which may provide procedures for, e.g., when a timing advance command MAC CE is received, when a timing advance command is received in a random access response message for a serving cell belonging to a TAG or in a MSGB for an SpCell, when an absolute timing advance command is received in response to a MSGA transmission including C-RNTI MAC CE, when a timeAlignmentTimer expires when it is associated with a PTAG, and/or when a timeAlignmentTimer expires when it is associated with a STAG, among other procedures.

In embodiments, TA may be acquired based on random access (RA) procedure (either CFRA or CBRA), such as, without limitation, a physical downlink control channel (PDCCH) ordered RA procedure, UE-triggered RA procedure, and/or a higher layer triggered RA procedure from a network node (other than a L3 handover command), among others. In embodiments, TA may be acquired based on non-RA procedure methods, such as, without limitation, sounding reference signal (SRS) based TA acquisition, receive timing difference based mechanisms (such as those in LTE), and/or UE-based TA measurement (including UE based TA measurement with one TAC from serving cell), among others. Such RA-based and non-RA-based methods for TA acquisition are within the scope of the present disclosure.

Figure 6A:
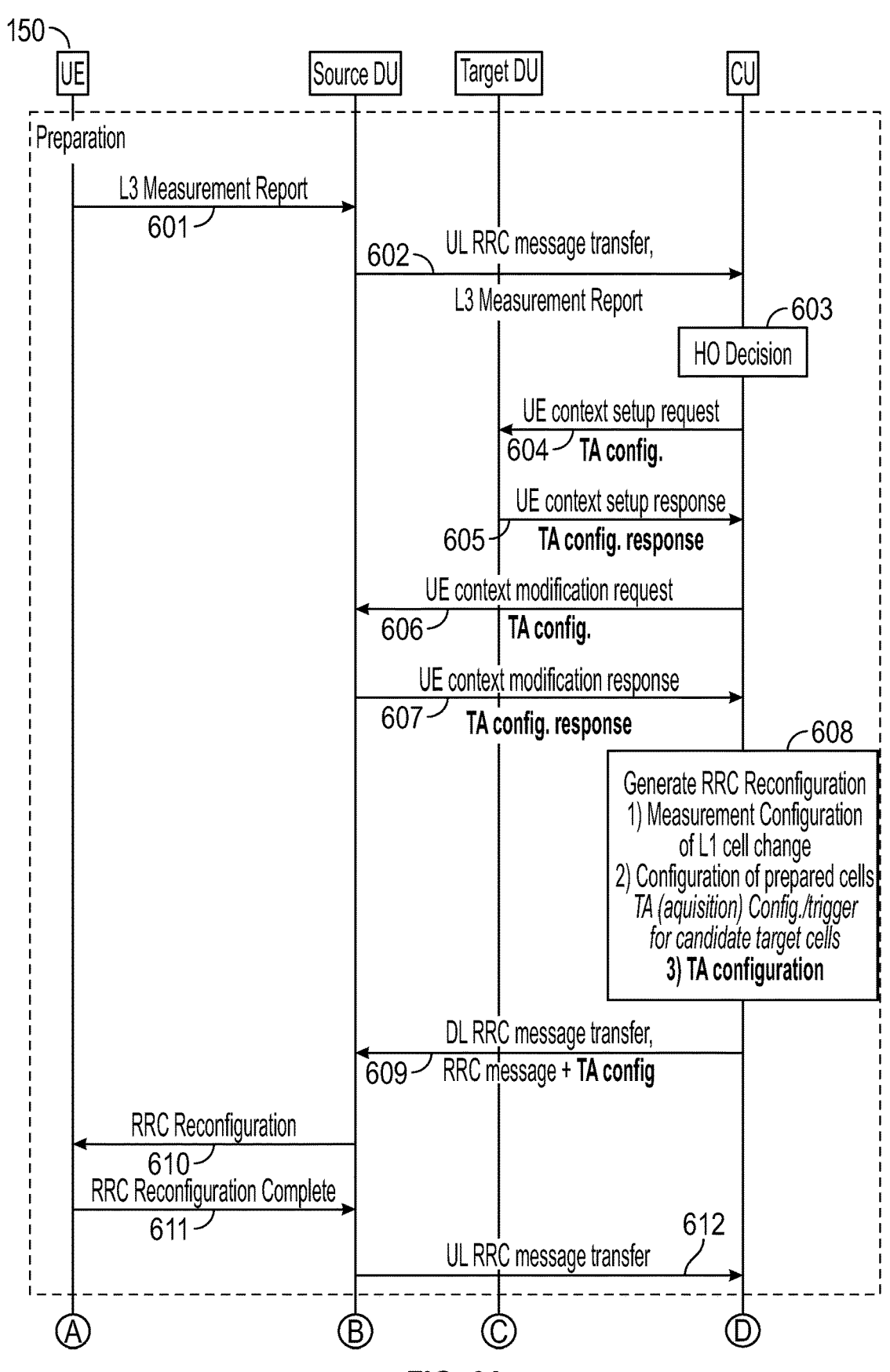
FIGS. 6A and 6B are diagrams of an example embodiment of signals and operations among a UE, a central unit (CU), a source distributed unit (DU), and a target DU, according to one illustrated aspect of the disclosure.
Figure 6B:
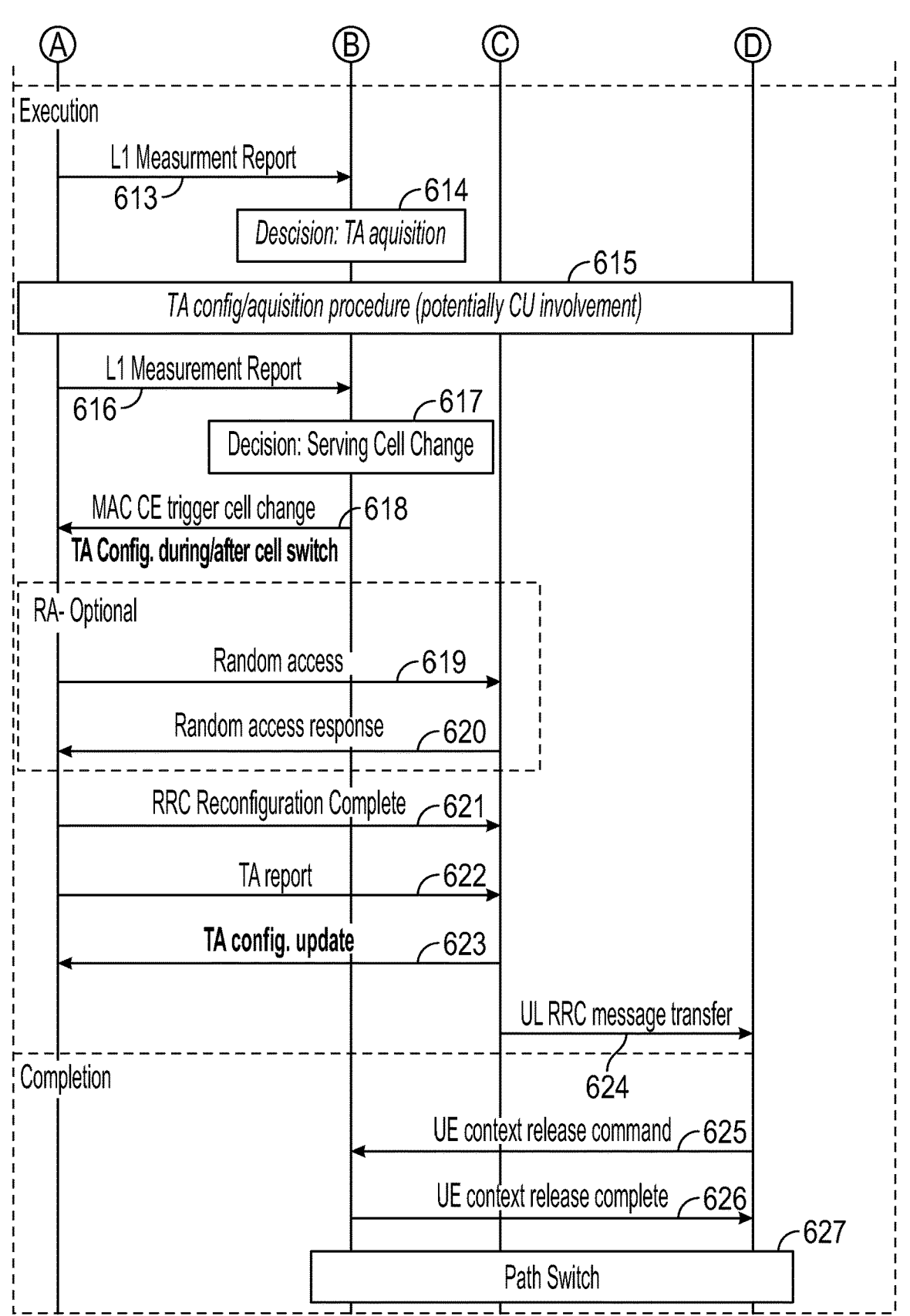

Referring now to FIG. 6A and FIG. 6B, example signals and operations for TA management are shown in relation to an inter-DU handover procedure. The handover procedure is merely illustrative, and it is contemplated that aspects of the disclosed technology may be applied to other procedures involving TA acquisition, such as, without limitation, dual connectivity, carrier aggregation, mTRP, fast handover, and/or dynamic point switching, among others. Additionally, the inter-DU scenario is illustrative, and aspects of the present disclosure may be applied to intra-DU and/or inter-CU scenarios, as well. Where the source DU and target DU are supported by different CUs, the source DU may be supported by a source CU and the target DU may be supported by a target CU, which can communicate via an Xn interface. As mentioned above, the terms "transmit towards", "receive from", and "cooperate with" (and their variations), include communications that may or may not involve communications through one or more intermediate devices or nodes. It is intended that any description referring to a DU shall also be treated as though the description refers to a network node which supports at least one of DU functionality or a layer 2 protocol of a radio access network (RAN). It is intended that any description referring to a CU shall also be treated as though the description refers to a network node which supports at least one of CU functionality or a layer 3 protocol of a radio access network (RAN).

The following paragraphs describe various signals and operations. It will be understood that the described signals may have associated operations and the described operations may have associated signals. Accordingly, a described signal may also be an operation and a described operation may also be a signal.

Prior to signal 601, the UE has established a connection with a DU (i.e., source DU) that supports the serving cell which serves the UE and has established a (logical) connection with the CU that supports the DU.

For signal 601, the UE transmits an L3 measurement report towards the source DU, and the source DU receives the L3 measurement report from the UE. Persons skilled in the art will understand an L3 measurement report, which may include averaged measurement samples of reference signals for a serving cell, for example. An L3 measurement report may indicate, for example, that a UE is nearing an edge of a cell and, thus, handover procedures should be initiated. For signal 602, the source DU forwards the L3 measurement report by transmitting the L3 measurement report towards the CU, and the CU receives the L3 measurement report from the source DU. For operation 603, the CU performs a handover (HO) decision, based on the L3 measurement report, about whether a handover should be prepared. For the illustrated embodiment, the CU decides that a handover should be prepared.

For signal 604, the CU transmits a UE context setup request towards the target DU to prepare the target DU for handover by setting up the UE context in the target DU. The target DU receives the UE context setup request from the CU and sets up the UE context. For signal 605, the target DU provides an acknowledgement by transmitting a UE context setup response towards the CU, and the CU receives the UE context setup response from the target DU. Although one target DU is illustrated, there may be more than one target DU if there are multiple candidate target cells. The signals at 604 and 605 may be used for each target DU and for multiple candidate target cells. The description below will refer to candidate target cell(s) to indicate there may be one candidate target cell or multiple candidate target cells and, where appropriate, will refer to target DU(s) supporting the candidate target cell(s). If a target DU and the source DU are supported by different CUs, the CUs may communicate using an Xn interface. For convenience, only one CU is illustrated (a CU supporting the source DU), but it is intended for the disclosed technology to apply to multi-CU situations, as well.

For signal 606, the CU transmits a UE context modification request towards the source DU for modification of the UE context in the source DU, if needed, and for the provision of the target cell information (e.g., target cell RS configuration, TCI states, etc.). The source DU receives the UE context modification request from the CU, modifies the UE context (if needed), and receives the target cell information. For signal 607, the source DU provides an acknowledgment by transmitting a UE context modification response towards the CU, and the CU receives the UE context modification response from the source DU.

In accordance with aspects of the present disclosure, for signals 604-607, the CU, the target DU(s), and the source DU may coordinate with each other regarding TA acquisition and configuration for the candidate target cell(s). For example, the source DU and the target DU(s) may coordinate (via the CU) on the method for the UE to acquire TA, such as a particular RA-based method or a particular non-RA-based method for acquiring TA. Further details of the coordination and the TA configuration will be described in more detail later herein.

For operation 608, the CU creates an RRC reconfiguration message, which includes a measurement configuration for an L1 cell change, a configuration of prepared cells, and a TA acquisition configuration and trigger for the candidate target cells. In embodiments, the RRC reconfiguration message may include TA configuration if CU involvement is needed later (in the execution phase). The TA configuration may, for example, specify the method for a UE to acquire TA, which may be specified based on the cooperation described above between the source DU and the target DU(s). In embodiments, the TA acquisition method can be configured/triggered based on L3 measurements by the CU-CP (in coordination with the source-DU). The TA configuration may specify other TA management options, which will be described later herein.

For signal 609, the CU transmits the RRC reconfiguration message towards the source DU using a downlink (DL) RRC message transfer, and the source DU receives the RRC reconfiguration message from the CU. As mentioned above, the RRC reconfiguration message may include the TA configuration mentioned above. For signal 610, the source DU transmits the RRC reconfiguration message towards the UE to forward it to the UE, and the UE receives the RRC reconfiguration message from the source DU. The UE performs a reconfiguration based on the RRC reconfiguration message. For signal 611, the UE responds by transmitting a RRC reconfiguration complete message towards the source DU using an uplink (UL) RRC message transfer, and the source DU receives the RRC reconfiguration complete message from the UE. For signal 612, the source DU transmits the RRC reconfiguration complete message towards the CU to forward it to the CU, and the CU receives the RRC reconfiguration complete message from the source DU. In embodiments, the signals 609-612 may be described as part of a logical connection between the UE and the CU, such that the CU transmits the RRC message towards the UE, and the UE receives the RRC message from the CU.

In embodiments, the signals and operations 601-612 described above may be referred to as a preparation phase. After the preparation phase is an execution phase.

In the execution phase, the UE, based on its configuration, provides periodic L1 measurement reports. Persons skilled in the art will understand L1 measurements. For signal 613, the UE periodically transmits the L1 measurement reports towards the source DU, and the source DU receives the periodic L1 measurement reports from the UE.

For operation 614, the source DU decides, based on the received L1 measurement report, whether to trigger the UE to acquire TA for the set of candidate cells (i.e., candidate cells for the handover configured by the CU for operation 608). The source DU may decide to trigger TA acquisition if, for example, L1 measurements move below or above a measurement threshold, among other criteria.

As mentioned above, in embodiments, the TA acquisition method can be configured/triggered based on L3 measurements by the CU-CP (in coordination with the source-DU). Accordingly, in embodiments, signal 613 may be an L3 measurement report transmitted toward the CU, and operation 614 may be an operation in the CU for deciding TA acquisition.

For operation 615, the UE acquires TA for the candidate target cell(s) using the TA acquisition method specified in the RRC reconfiguration message of operation 608. As described above, TA may be acquired based on random access (RA) procedure (either CFRA or CBRA), such as, without limitation, a physical downlink control channel (PDCCH) ordered RA procedure, UE-triggered RA procedure, and/or a higher layer triggered RA procedure from a network node (other than a L3 handover command), among others. In embodiments, TA may be acquired based on non-RA procedure methods, such as, without limitation, sounding reference signal (SRS) based TA acquisition, receive timing difference based mechanisms (such as those in LTE), and/or UE-based TA measurement (including UE based TA measurement with one TAC from serving cell), among others. Such RA-based and non-RA-based methods for TA acquisition are within the scope of the present disclosure. After operation 615, the UE would have TA values for the candidate target cell(s) before a cell switch is triggered.

For signal 616, the UE continues L1 measurement reporting and periodically transmits L1 measurement reports towards the source DU, and the source DU receives the periodic L1 measurement reports from the UE. For operation 617, the source DU decides whether the UE should change serving cells. In embodiments, the source DU may decide that the UE should change serving cells if the L1 measurements move below or above a threshold, for example. Once the source DU decides that the UE should be handed over to a cell (e.g., target cell supported by target DU), the source DU triggers the cell switch using a cell switch command (e.g., a MAC CE).

For signal 618, the cell switch command (e.g., MAC CE) is transmitted by the source DU towards the UE, and the UE receives the cell switch command (e.g., MAC CE) from the source DU. In embodiments, the cell switch command may contain the TA value for the target cell. In embodiments, the cell switch command may contain a TA configuration for the UE to use during and/or after the cell switch. The source DU may have the TA configuration from receiving the RRC message for signal 609. Further details of the TA configuration will be described later herein.

In response to the cell switch command, the UE applies the RRC configuration for the target cell of the target DU indicated by the cell switch command, to switch to the target DU/target cell as the serving cell. In embodiments, the UE may be configured to perform random access (RA) procedure to the target cell and target DU as shown in signals 619 and 620. However, in embodiments, the UE may be configured to not perform RA procedure to the target cell/target DU if it has already acquired the TA value of the target cell.

For signal 621, to initiate communication with the target DU, the UE transmits an RRC reconfiguration complete message towards the target DU using already configured uplink (UL) resources, and the target DU receives the RRC reconfiguration complete message from the UE. (Signals 622 and 623 will be described below.) For signal 624, The target DU forwards the RRC reconfiguration complete message using UL RRC message transfer to transmit the RRC reconfiguration complete message towards the CU, and the CU receives the RRC reconfiguration complete message from the target DU. For signal 625, the CU transmits a UE context release command/request towards the source DU to release the UE context from the source DU, and the source DU receives the UE context release command/request from the CU. The source DU releases the UE context in response to the UE context release command/request. For signal 626, the source DU transmits a UE context release complete message towards the CU, and the CU receives the UE context release complete message from the source DU. For operation 627, the CU performs path switch to the target DU as the new DU supporting the serving cell.

The following will now provide more details regarding various signals and operations of FIG. 6A and FIG. 6B.

In accordance with aspects of the present disclosure, and as mentioned above, for signals and operations 604-609, the source DU, candidate target DU(s), and CU may coordinate with each other regarding a UE's TA acquisition for the candidate target cell(s) and regarding TA configuration. For example, the source DU and the target DU(s) may coordinate (via the CU) on the method for the UE to acquire TA, such as a particular RA-based method or a particular non-RA-based method for acquiring TA. As another example, the TA configuration may contain information regarding how TA should be managed in the UE before a cell switch, after receiving a cell switch command and during a cell switch procedure, and/or after a cell switch.

In embodiments, the target DU can inform the source DU whether the UE can maintain the timing advance values (acquired for a set of candidate target cells before a cell switch) during or after the cell switch. The CU may include this indication in the TA configuration for operation 608, the source DU may inform the UE of this indication in signal 618, and the UE may receive indication.

In embodiments, the target DU can inform the source DU whether the UE can maintain a subset of the timing advance values (acquired before a cell switch) or a subset of timing advance groups, during or after the cell switch. The subset of timing advance values may correspond to a subset of candidate target cells which have at least one of: measurement quality above a predefined value, measurement quality above a threshold with respect to the serving cell for a predefined time duration, measurement quality above a threshold with respect to the serving cell for a predefined number of samples, measurement quality above a threshold with respect to a cell (of the set of candidate target cells) for a predefined time duration, measurement quality above a threshold with respect to a cell (of the set of candidate target cells) for a predefined number of samples. The CU may include this indication in the TA configuration for operation 608, the source DU may inform the UE of this indication in signal 618, and the UE may receive indication.

In embodiments, the target DU can inform the source DU whether the UE can expire any running time alignment timers upon the cell switch. The CU may include this indication in the TA configuration for operation 608, the source DU may inform the UE of this indication in signal 618, and the UE may receive indication.

In embodiments, the source DU may provide UE with additional conditions and configurations on how to update TAG when TAT expires, during the time after receiving cell switching command, during cell switching procedure (e.g., after receiving cell switch command), and for a time after switching to a new target cell.

In embodiments, the source DU may inform the UE to not reacquire/update TA for a candidate target cell(s) if it is not within the Q best cells (Q <N), or if the candidate target cell has at least one of: measurement quality below a predefined value, measurement quality below a threshold with respect to the serving cell, or measurement quality below a threshold with respect to at least one other candidate target cell among the set of candidate target cells. The CU may include this indication in the TA configuration for operation 608, the source DU may inform the UE of this indication in signal 618, and the UE may receive indication.

In embodiments, the source DU may inform the UE not to reacquire TA or TAG for a candidate target cell after receiving a cell switch command, during cell switching procedure, and/or for a period of time after moving to a new target cell. The CU may include this indication in the TA configuration for operation 608, the source DU may inform the UE of this indication in signal 618, and the UE may receive indication.

In embodiments, the source DU may inform the UE that it may use a different method/configuration (e.g., to reduce the interruption and UE complexity) to acquire/update the TA after TAT expiry, during a time after receiving cell switch command, during cell switch, and after moving to a new cell. The CU may include this indication in the TA configuration for operation 608, the source DU may inform the UE of this indication in signal 618, and the UE may receive indication.

In embodiments, the source DU may configure the UE to reset/restart TA timers or provide new timer configurations to the UE (for a set of cells) when receiving a cell switch command or after cell switch. The CU may include this indication in the TA configuration for operation 608, the source DU may inform the UE of this indication in signal 618, and the UE may receive indication.

As described above, for signals and operations 613-615, the source DU makes a decision regarding TA acquisition based on the L1 measurement report, and for operation 615, the UE acquires TA for one or more candidate target DUs. In accordance with aspects of the present disclosure, the candidate target cells (and the candidate target DUs which support them) may be selected based on the L1 measurements, such as, measurement quality above a predefined value, measurement quality above a threshold with respect to the serving cell for a predefined time duration, or measurement quality above a threshold with respect to the serving cell for a predefined number of samples.

In accordance with aspects of the present disclosure, after making a decision for the cell switch for operation 617, the source DU informs the UE, via signal 618, about how to maintain and update TA during the time after receiving the cell switch command, during cell switch, and after the cell switch, by taking into account target node feedback and UE capability.

In embodiments, the cell switch command (also called LTM trigger command) may include one or more of: an indication of whether the UE should expire the running TATs upon cell switch; an indication of whether the UE should maintain the obtained Tas after/during the cell switch procedure; an indication of whether the UE should maintain and report the obtained Tas after/during the cell switch procedure; an indication of whether the UE should maintain and report the obtained cell IDs (e.g. PCI/TCI state or any similar ID) for which the Tas are obtained, after/during the cell switch procedure; an indication of whether the UE should maintain and report the obtained cell IDs (e.g. PCI/TCI state or any similar ID) for which the Tas are obtained and the TA values, after/during the cell switch procedure; and/or an indication of whether the UE should maintain and report the obtained cell IDs (e.g. PCI/TCI state or any similar ID) for which the Tas are obtained and the TA values if the TAT timer for the respective cell is running and will not expire within a predetermined duration after/during the cell switch procedure.

In accordance with aspects of the present disclosure, after the UE transmits the RRC reconfiguration complete message for signal 621, the UE transmits a timing advance (TA) report towards the target DU for signal 622, and the target DU receives the TA report from the UE. The target DU determines, based on the TA report, whether a TA configuration update is needed. For signal 623, the target DU transmits a TA configuration update towards the UE, and the UE receives the TA configuration update from the target DU.

In embodiments, the UE receives, from the source DU or the CU, configuration information for transmitting a timing advance report. In embodiments, the configuration information indicates inclusion, in the timing advance report, of at least one of: physical cell IDs (PCI) and/or a TCI-state ID of a timing advance group (TAG), transmission configuration index states of a TAG, timing advance value associated with a TAG, time alignment timer status associated with a TAG, timing advance acquisition method and UE preference for timing advance acquisition, or UE capabilities for timing advance acquisition. The UE capabilities include at least one of: number of TAGs, number of cells, method for acquiring timing advance, or timing advance update limitations. In embodiments, the configuration information includes uplink resources allocated by the target DU that enables the UE to transmit the TA report to the target DU after the cell switch.

In embodiments, for signal 623, the UE receives, from the target DU, after a cell switch to the target cell, updated TA configuration information that includes at least one of: an indication of whether to maintain timing advance values for at least one cell of the set of candidate target cells, an indication to add a cell to a timing advance group, an indication to remove a cell from a timing advance group, an indication to configure a new timing advance group, a time alignment timer configuration, or configurations on a method for acquiring timing advance after time alignment timer expiry.

The embodiments of signals 622 and 623 are merely illustrative, and variations are contemplated to be within the scope of the present disclosure. For example, in embodiments, after the cell switch, the UE may receive a request for the TA report from the target DU, and the UE may transmit the TA report to the target DU in response to the request. In embodiments, prior to a cell switch to the target cell or during the cell switch to the target cell, the UE may transmit the TA report towards the source DU, which may relay the TA report to the target DU (e.g., through the CU). Such and other variations are contemplated to be within the scope of the present disclosure.

In accordance with aspects of the present disclosure, an embodiment of operations from the perspective of the UE is as follows. In embodiments, the UE establishes a connection with a first network node (e.g., source DU) via a serving cell, where the first network node supports the serving cell and supports at least one of distributed unit (DU) functionality or a layer 2 protocol of a radio access network; receives, from a second network node (e.g., CU) supporting at least one of central unit control plane (CU-CP) functionality or a layer 3 protocol of the radio access network, a radio resource control (RRC) message comprising configuration information relating to timing advance, the configuration information configured to prepare the user equipment apparatus (UE) for at least one candidate target cell with which the UE may connect, where the RRC message is received prior to the UE connecting with any of the at least one candidate target cell; and implements a configuration based on the configuration information.

In accordance with aspects of the present disclosure, an embodiment of operations from the perspective of the CU is as follows. In embodiments, the CU establishes a connection with a user equipment apparatus (UE) via a serving cell; determines a radio resource control (RRC) message comprising configuration information relating to timing advance, where the configuration information is configured to prepare the UE for at least one candidate target cell with which the UE may connect; and transmits, towards the UE, prior to the UE connecting with any of the at least one candidate target cell, the RRC message comprising the configuration information.

In accordance with aspects of the present disclosure, an embodiment of operations from the perspective of the source DU is as follows. In embodiments, the source DU establishes a connection with a user equipment apparatus (UE) via the cell acting as a serving cell; receives, from a control network node (e.g., CU) which supports at least one of central unit control plane (CU-CP) functionality or a layer 3 protocol of the radio access network, a L1/L2 triggered mobility (LTM) configuration related to the UE; and transmits, towards the UE, prior to the UE connecting with any candidate target cell, a message comprising timing advance-related configuration information.

In accordance with aspects of the present disclosure, an embodiment of operations from the perspective of the target DU is as follows. In embodiments, the target DU receives, from a control network node which supports at least one of central unit control plane (CU-CP) functionality or a layer 3 protocol of the radio access network, a L1/L2 triggered mobility (LTM) configuration related to a user equipment apparatus (UE), where the control network node (e.g., CU) is connected to the UE via a serving cell; and coordinates with a source network node (e.g., source DU), which supports the serving cell and supports at least one of distributed unit (DU) functionality or a level 2 protocol of the radio access, prior to a cell switch command being sent to the UE, regarding timing advance management before, during, or after a cell switch from the serving cell to the target cell.

The signals and operations of FIG. 6A and FIG. 6B are merely illustrative, and variations are contemplated to be within the scope of the present disclosure. For example, the signals and operations may assume one TA value per physical cell ID (PCI). In embodiments, to cover multi-TRP (multi-transmit receipt point) scenarios, the UE may be configured and required to acquire multiple Tas for a PCI, such as, for example, different TA values for different sets of TCI-states (transmission configuration indicator states). In embodiments, the signals and operations may include others not illustrated in FIG. 6A and FIG. 6B. In embodiments, the signals and operations may not include every signal and operation illustrated in FIG. 6A and FIG. 6B. In embodiments, the signals and operations may be implemented in a different order than that illustrated in FIG. 6A and FIG. 6B. Such and other embodiments are contemplated to be within the scope of the present disclosure.

Figure 7A:
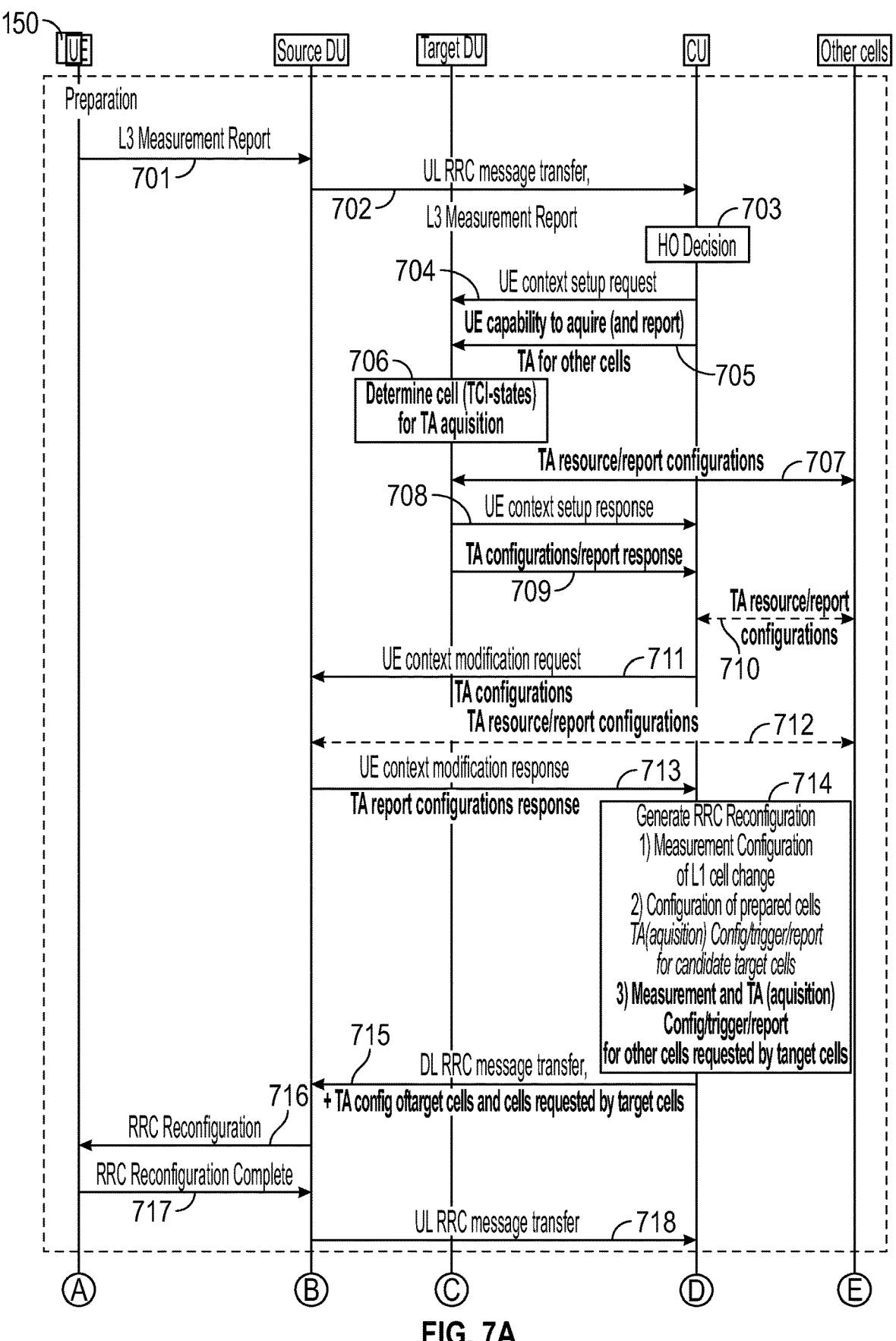
FIGS. 7A and 7B are diagrams of an example embodiment of signals and operations among a UE, a CU, a source DU, a target DU, and other cells, according to one illustrated aspect of the disclosure.
Figure 7B:
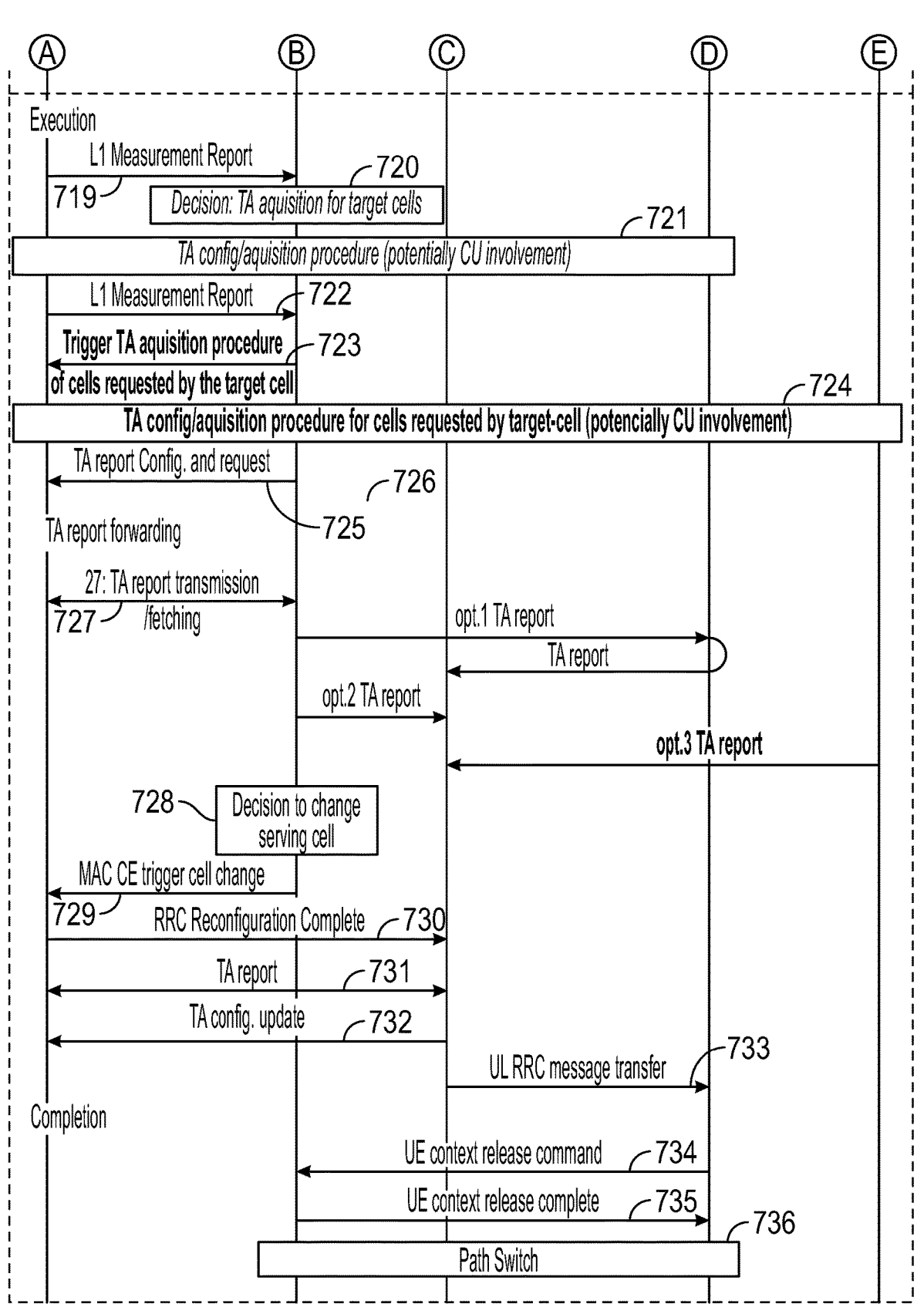

Referring now to FIG. 7A and FIG. 7B, example signals and operations for TA management are shown in relation to an inter-DU handover procedure where a target DU requests a UE to acquire TA for other candidate target cells with which a UE may connect after a cell switch. The handover procedure is merely illustrative, and it is contemplated that aspects of the disclosed technology may be applied to other procedures involving TA acquisition, such as, without limitation, dual connectivity, carrier aggregation, mTRP, fast handover, and/or dynamic point switching, among others. Additionally, the inter-DU scenario is illustrative, and aspects of the present disclosure may be applied to intra-DU and/or inter-CU scenarios, as well. Where the source DU and target DU are supported by different CUs, the source DU may be supported by a source CU and the target DU may be supported by a target CU, which can communicate via an Xn interface. In this scenario, a target DU or target CU may request a UE to acquire TA for other candidate target cells with which a UE may connect after a cell switch. As mentioned above, the terms "transmit towards", "receive from", and "cooperate with" (and their variations), include communications that may or may not involve communications through one or more intermediate devices or nodes. It is intended that any description referring to a DU shall also be treated as though the description refers to a network node which supports at least one of DU functionality or a layer 2 protocol of a radio access network (RAN). It is intended that any description referring to a CU shall also be treated as though the description refers to a network node which supports at least one of CU functionality or a layer 3 protocol of a radio access network (RAN).

Aspects of the signals and operations of FIG. 7A and FIG. 7B are the same as or similar to various signals and operations of FIG. 6A and FIG. 6B. For clarity, the signals and operations of FIG. 7A and FIG. 7B will be described in detail. Aspects of FIG. 7A and FIG. 7B are intended to be usable with aspects of FIG. 6A and FIG. 6B.

The following paragraphs describe various signals and operations. It will be understood that the described signals may have associated operations and the described operations may have associated signals. Accordingly, a described signal may also be an operation and a described operation may also be a signal.

Prior to signal 701, the UE has established a connection with a DU (i.e., source DU) that supports the serving cell which serves the UE and has established a (logical) connection with the CU that supports the DU.

For signal 701, the UE transmits an L3 measurement report towards the source DU, and the source DU receives the L3 measurement report from the UE. Persons skilled in the art will understand an L3 measurement report, which may include averaged measurement samples of reference signals for a serving cell, for example. An L3 measurement report may indicate, for example, that a UE is nearing an edge of a cell and, thus, handover procedures should be initiated. For signal 702, the source DU forwards the L3 measurement report using uplink (UL) RRC message transfer by transmitting the L3 measurement report towards the CU, and the CU receives the L3 measurement report from the source DU. For operation 703, the CU performs a handover (HO) decision, based on the L3 measurement report, about whether a handover should be prepared. For the illustrated embodiment, the CU decides that a handover should be prepared.

For signal 704, the CU transmits a UE context setup request towards the target DU to prepare the target DU for handover by setting up the UE context in the target DU. The target DU receives the UE context setup request from the CU and sets up the UE context. (Signals and operations 705-707 are described below.) For signal 708, the target DU provides an acknowledgement by transmitting a UE context setup response towards the CU, and the CU receives the UE context setup response from the target DU. Although one target DU is illustrated, there may be more than one target DU if there are multiple candidate target cells. The signals at 704 and 708 may be used for each target DU and for multiple candidate target cells. The description below will refer to candidate target cell(s) to indicate there may be one candidate target cell or multiple candidate target cells and, where appropriate, will refer to target DU(s) supporting the candidate target cell(s). If a target DU and the source DU are supported by different CUs, the CUs may communicate using an Xn interface. For convenience, only one CU is illustrated (a CU supporting the source DU), but it is intended for the disclosed technology to apply to multi-CU situations, as well.

Signals and operations 705-707 relate to a target DU determining other cells that the UE may connect with after cell switch (e.g., for dual connectivity or carrier aggregation, etc.) and that the target DU would like the UE to acquire TA for. If a target DU and the source DU are supported by different CUs, a target DU or target CU may determine other cells which the UE may connect with after cell switch (e.g., for dual connectivity or carrier aggregation, etc.) and which the target DU would like the UE to acquire TA. For signal 705, the CU informs the target DU(s)/target cell(s) about the UE capability to acquire/maintain TA of other cells before a cell switch and potentially report them after cell switch. The CU transmits this information towards the target DU, and the target DU receives this information from the CU. (In embodiments, the source DU or CU may provide UE measurements of other detected cells so that the target DU can estimate their signal strength and/or qualities.) If a target DU and the source DU are supported by different CUs, the source CU may transmit the above information towards the target CU. For operation 706, the target DU or target CU determines, based on the information about UE capability, a set of other cells/TRPs (or TCI-states) for which the target DU would like the UE to acquire TA. For signal 707, the target DU coordinates with the DU(s) supporting the set of other cells regarding the method, resource, and configurations for TA acquisition and update and for reporting of acquired TA information. For signal 709, the target DU informs the CU about TA configurations (which may include IDs) of the other cells for which the UE shall acquire TA, about method/resources to acquire and update TA, about TAT configurations, and/or about the configuration for reporting the acquired TA, among other possible information relating to the other cells. The target DU transmits this information towards the CU, and the CU receives this information from the target DU. If a target DU and the source DU are supported by different CUs, the target CU may transmit the above information towards the source CU. The target cell, which requests the other cells, may form a group of associated cells with the other cells, such that a subsequent handover or other actions can be prepared ahead of/in case of handover to the target cell (so in case of handover, TA of the associated other cells would already have been requested).

In embodiments, rather than or in addition to the coordination being carried out by the target DU with the other cell(s) (for signal 707), the CU may carry out the coordination with the DU(s) of the other cell(s) (for signal 710) and/or the source DU may carry out the coordination with the DU(s) of the other cell(s) (for signal 712). The coordination of signals 707, 710, and/or 712, may include exchanging RRC, UE context, and/or measurement configurations.

For signal 711, the CU coordinates TA configurations with the source DU by transmitting a UE context modification request towards the source DU, and the source DU receives the UE context modification request from the CU. The TA configuration includes the cells for which the UE shall acquire the TA before cell switch (i.e., the target cell supported by the target DU and the other cells requested by the target DU) and includes TA reporting configuration and corresponding uplink (UL) resources for reporting the acquired TA after cell switch.

The source DU receives the UE context modification request from the CU and modifies the UE context, if needed. For signal 713, the source DU provides an acknowledgment by transmitting a UE context modification response towards the CU, and the CU receives the UE context modification response from the source DU.

For operation 714, the CU creates an RRC reconfiguration message, which includes a TA configuration for the target cell(s) and for the other cell(s) requested by the target cell(s). The TA configuration includes one or more of: a measurement configuration for a L1 cell change, a configuration of prepared target cell(s), a TA acquisition configuration and trigger for the target cell(s), as well as measurement, TA acquisition configuration and trigger, and reporting configuration for the other cells requested by the target cell(s). The TA configuration may, for example, specify the method for a UE to acquire TA. In embodiments, the TA acquisition method can be configured/triggered based on L3 measurements by the CU-CP (in coordination with the source-DU). The TA configuration may specify other TA management options, such as those described above in connection with FIG. 6A and FIG. 6B.

For signal 715, the CU transmits the RRC reconfiguration message towards the source DU using a downlink (DL) RRC message transfer, and the source DU receives the RRC reconfiguration message from the CU. As mentioned above, the RRC reconfiguration message may include the TA configuration mentioned above. For signal 716, the source DU transmits the RRC reconfiguration message towards the UE to forward it to the UE, and the UE receives the RRC reconfiguration message from the source DU. The UE performs a reconfiguration based on the RRC reconfiguration message. For signal 717, the UE responds by transmitting a RRC reconfiguration complete message towards the source DU using an uplink (UL) RRC message transfer, and the source DU receives the RRC reconfiguration complete message from the UE. For signal 718, the source DU transmits the RRC reconfiguration complete message towards the CU to forward it to the CU, and the CU receives the RRC reconfiguration complete message from the source DU. In embodiments, the signals 715-718 may be described as part of a logical connection between the UE and the CU, such that the CU transmits the RRC message towards the UE, and the UE receives the RRC message from the CU.

In embodiments, the signals and operations 701-718 described above may be referred to as a preparation phase. After the preparation phase is an execution phase.

In the execution phase, the UE, based on its configuration, provides periodic L1 measurement reports. Persons skilled in the art will understand L1 measurements. For signal 719, the UE periodically transmits the L1 measurement reports towards the source DU, and the source DU receives the periodic L1 measurement reports from the UE.

For operation 720, the source DU decides, based on the received L1 measurement report, whether to trigger the UE to acquire TA for the set of candidate target cells (i.e., candidate target cells for the handover configured by the CU for operation 714). The source DU may decide to trigger TA acquisition if, for example, L1 measurements move below or above a measurement threshold, among other criteria.

In embodiments, the TA acquisition method can be configured/triggered based on L3 measurements by the CU-CP (in coordination with the source-DU). Accordingly, in embodiments, signal 719 may be an L3 measurement report transmitted toward the CU, and operation 720 may be an operation in the CU for deciding TA acquisition.

For operation 721, the UE acquires TA for the candidate target cell(s) using the TA acquisition method specified in the RRC reconfiguration message of operation 714. As described above, TA may be acquired based on random access (RA) procedure (either CFRA or CBRA), such as, without limitation, a physical downlink control channel (PDCCH) ordered RA procedure, UE-triggered RA procedure, and/or a higher layer triggered RA procedure from a network node (other than a L3 handover command), among others. In embodiments, TA may be acquired based on non-RA procedure methods, such as, without limitation, sounding (such as those in LTE), and/or UE-based TA measurement (including UE based TA measurement with one TAC from serving cell), among others. Such RA-based and non-RA-based methods for TA acquisition are within the scope of the present disclosure. After operation 721, the UE will have TA values for the candidate target cell(s) before a cell switch is triggered.

For signal 722, the UE continues L1 measurement reporting and periodically transmits L1 measurement reports towards the source DU, and the source DU receives the periodic L1 measurement reports from the UE.

Based on the L1 measurement report (and before the cell switch), the source DU may trigger TA acquisition of the other cells requested by the target cell (if not already acquired). For signal 723, the source DU transmits the TA acquisition message to the UE, and the UE receives the TA acquisition message from the source DU. For operation 724, the UE initiates TA acquisition for the other cells requested by the target DU or by the target CU if a target DU and the source DU are supported by different CUs. The operation 724 for acquiring TA for the other cell(s) is similar to the operation 721 for acquiring TA for the target cell(s). Accordingly, the description relating to operation 721 may apply to operation 724.

The signals and operations 725-727,31, and 32, relate to a TA report. Such signals and operations are similar to the TA report aspects of FIG. 6A and FIG. 6B and will be described later below.

For operation 728, the source DU decides whether the UE should change serving cells. In embodiments, the source DU may decide that the UE should change serving cells if the L1 measurements move below or above a threshold, for example. Once the source DU decides that the UE should be handed over to a cell (e.g., target cell supported by target DU), the source DU triggers the cell switch using a cell switch command (e.g., a MAC CE).

For signal 729, the cell switch command (e.g., MAC CE) is transmitted by the source DU towards the UE, and the UE receives the cell switch command (e.g., MAC CE) from the source DU. In embodiments, the cell switch command may contain the TA value for the target cell. In embodiments, the cell switch command may contain a TA configuration for the UE to use during and/or after the cell switch. The source DU may have the TA configuration from receiving the RRC message for signal 715. The TA configuration for the UE to use during and/or after the cell switch is similar to those described in connection with FIG. 6A and FIG. 6B. Such aspects of FIG. 6A and FIG. 6B are usable with the cell switch command of signal 729.

In response to the cell switch command, the UE applies the RRC configuration for the target cell of the target DU indicated by the cell switch command, to switch to the target DU/target cell as the serving cell. For signal 730, to initiate communication with the target DU, the UE transmits an RRC reconfiguration complete message towards the target DU using already configured uplink (UL) resources, and the target DU receives the RRC reconfiguration complete message from the UE. (Signals 731 and 732 will be described below.) For signal 733, the target DU forwards the RRC reconfiguration complete message using UL RRC message transfer to transmit the RRC reconfiguration complete message towards the CU, and the CU receives the RRC reconfiguration complete message from the target DU. For signal 734, the CU transmits a UE context release command/ request towards the source DU to release the UE context from the source DU, and the source DU receives the UE context release command/request from the CU. The source DU releases the UE context in response to the UE context release command/request. For signal 735, the source DU transmits a UE context release complete message towards the CU, and the CU receives the UE context release complete message from the source DU. For operation 736, the CU performs path switch to the target DU as the new DU supporting the serving cell.

The following will now provide more details regarding various signals and operations of FIG. 7A and FIG. 7B.

In accordance with aspects of the present disclosure, for signals and operations 704, 708, 711, and 713, the source DU, candidate target DU(s), and CU may coordinate with each other regarding a UE's TA acquisition for the candidate target cell(s) and regarding TA configuration. Such coordination is similar to that described in FIG. 6A and FIG. 6B, and such aspects of FIG. 6A and FIG. 6B may be used for FIG. 7A and FIG. 7B. The source DU may inform the UE of the result of the coordination.

In accordance with aspects of the present disclosure, for signals and operations 719-721, the DU makes a decision regarding TA acquisition based on the L1 measurement report, and for operation 721, the UE acquires TA for one or more candidate target cells. The candidate target cells (and the candidate target DUs which support them) may be selected based on the L1 measurements in a manner similar to that described in FIG. 6A and FIG. 6B, and such aspects of FIG. 6A and FIG. 6B may be used for FIG. 7A and FIG. 7B.

In accordance with aspects of the present disclosure, after making a decision for the cell switch for operation 728, the source DU informs the UE, via signal 729, about how to maintain and update TA during the time after receiving the cell switch command, during cell switch, and after the cell switch. In embodiments, the cell switch command (also called LTM trigger command) may include one or more indications similar to those described in FIG. 6A and FIG. 6B, and such aspects of FIG. 6A and FIG. 6B may be used for FIG. 7A and FIG. 7B.

In accordance with aspects of the present disclosure, after the UE transmits the RRC reconfiguration complete message for signal 730, the UE transmits a timing advance (TA) report towards the target DU for signal 731, and the target DU receives the TA report from the UE. The target DU determines, based on the TA report, whether a TA configuration update is needed. For signal 732, the target DU transmits a TA configuration update towards the UE, and the UE receives the TA configuration update from the target DU. The TA report and TA configuration update, and their transmission and reception, are similar to those described in FIG. 6A and FIG. 6B, and such aspects of FIG. 6A and FIG. 6B may be used for FIG. 7A and FIG. 7B.

In accordance with aspects of the present disclosure, before the source DU decides to trigger a cell switch (for operation 728), the source DU may transmit a TA report configuration and request towards the UE for signal 725. The UE may transmit a timing advance (TA) report towards the source DU for signal 727, and the source DU receives the TA report from the UE. In case the UE may not automatically transmit the TA report towards the source DU, signal 727 may include a request from the source DU to the UE for the UE to fetch the TA report and to transmit it towards the source DU. After the source DU receives the TA report from the UE, the source DU may transmit the TA report towards the target DU either through the CU (option 1) or directly to the target DU (option 2). In embodiments, the other cells may provide a TA report to the target DU, as well (option 3). The TA report is similar to that described in FIG. 6A and FIG. 6B, and such aspects of FIG. 6A and FIG. 6B may be used for FIG. 7A and FIG. 7B.

In accordance with aspects of the present disclosure, and as described above for signal 705, the CU informs the target DU about the UE capability to be configured to acquire, store, and maintain TA for a set of other cells and about the possibility to report TA information to the target DU after cell switch. In embodiments, for signal 705, the CU can indicate the maximum number of other cells (and/or TA values) that the target DU or target CU can request for TA acquisition and can indicate the method to be used by the UE to acquire, maintain, and update TA values (e.g., PDCCH order, CFRA/CBRA, SRS, DL-RS based estimation, etc.). In embodiments, for signal 705, the CU can indicate information about the measurements for the other cells, so that the target DU may determine whether other cells have sufficient signal quality for TA acquisition.

In accordance with aspects of the present disclosure, and as described above for signal 709, the target DU can inform the CU about other cell IDs (or TCI-states) for TA acquisition and corresponding configurations. The configurations may include one or more of: TAG (PCI-IDs and potentially corresponding TCI-states); TAT status associated with each TAG (PCI/TCI state); TA acquisition/update method and preference for TA acquisition/update; TA report configurations and methods; potential configurations and resources for other cell measurement and TA acquisition/update resources (e.g., CBRA, CFRA, SRS, measurement gap, etc.) (this configuration can be fetched by the source DU or CU, as well); and/or signal related conditions (e.g., threshold for RSRP of other cell(s)) which the other cell(s) must satisfy before the UE can acquire their TA.

In accordance with aspects of the present disclosure, and as described above for signals 710 and 712, the CU and/or the source DU may accept the target DU's request to have the UE acquire TA values of the other cells proposed by the target cell, and in case of acceptance, the CU and/or the source DU may coordinate with requested other cells on resources/configurations for measurement and TA acquisition (if not obtained by the target cell for signal 707).

In accordance with aspects of the present disclosure, and as described above for operation 714, the CU uses RRC reconfiguration to configure the UE to acquire, maintain and update the TA value(s) of the target cell and of the other cell(s) requested by the target cell. In embodiments, the configuration may include different configurations for how to treat the TA values acquired by the UE based timing, i.e., before cell switch command, after receiving cell switch command, or after cell switch. The configurations may be similar to those described in FIG. 6A and FIG. 6B, and such aspects of FIG. 6A and FIG. 6B may be used for FIG. 7A and FIG. 7B.

In accordance with aspects of the present disclosure, an embodiment of operations from the perspective of the UE is as follows. In embodiments, the UE establishes a connection with a control network node (e.g., CU) via a serving cell, where the control network node supports at least one of control unit-control plane (CU-CP) functionality or a layer 3 protocol of a radio access network; receives, from the control network node, an RRC message comprising: configuration information configured to prepare the user equipment apparatus (UE) for at least one candidate target cell with which the UE may connect, where the configuration information is received prior to the UE connecting with any of the at least one candidate target cell, and further configuration information configured to prepare the user equipment apparatus (UE) to at least one of: acquire timing advance (TA) for at least one other cell with which the UE may connect in case the UE connects with one of the at least one candidate target cell, or perform cell detection or measurement of the at least one other cell, wherein the further configuration information is received prior to the UE connecting with any of the at least one other cell; and implements a configuration based on the configuration information and the further configuration information.

In accordance with aspects of the present disclosure, an embodiment of operations from the perspective of the CU is as follows. In embodiments, the CU establishes a connection with a user equipment apparatus (UE) via a serving cell; determines at least one candidate target cell with which the UE may connect; receives, from at least one target network node (e.g., target DU) which supports the at least one candidate target cell and which supports at least one of distributed unit (DU) functionality or a layer 2 protocol of the radio access network, a selection of at least one other cell with which UE may connect in case the UE connects with one of the at least one candidate target cell; determines a radio resource control (RRC) message comprising: configuration information configured to prepare the UE for the at least one candidate target cell, and further configuration information configured to prepare the UE to acquire timing advance (TA) for the at least one other cell; and transmits, towards the UE, prior to the UE connecting with any of the at least one candidate target cell, the RRC message comprising the configuration information and the further configuration information.

In accordance with aspects of the present disclosure, an embodiment of operations from the perspective of the target DU is as follows. In embodiments, the target DU receives, from a control network node (e.g, CU) which supports at least one of control unit-control plane (CU-CP) functionality or a layer 3 protocol of the radio access network: a context setup request for a user equipment apparatus (UE), and information about capability of the UE to be configured to acquire, store, and maintain timing advance (TA) for a plurality of cells; selects, among the plurality of cells, at least one other cell with which UE may connect in case the UE connects with the target cell; and transmits, towards the control network node, a request for the UE to acquire TA for the at least one other cell.

In accordance with aspects of the present disclosure, an embodiment of operations from the perspective of the source DU is as follows. In embodiments, the source DU establishes a connection with a user equipment apparatus (UE) via the serving cell, where the UE is prepared for at least one candidate target cell with which the UE may connect, and the UE configured to acquire timing advance (TA) for at least one other cell with which the UE may connect in case the UE connects with one of the at least one candidate target cell; and prior to the UE connecting with one of the at least one candidate target cell, triggers the UE to acquire TA for the at least one other cell.

The signals and operations of FIG. 7A and FIG. 7B are merely illustrative, and variations are contemplated to be within the scope of the present disclosure. For example, the signals and operations may assume one TA value per physical cell ID (PCI). In embodiments, to cover multi-TRP (multi-transmit receipt point) scenarios, the UE may be configured and required to acquire multiple Tas for a PCI, such as, for example, different TA values for different sets of TCI-states (transmission configuration indicator states). In embodiments, the signals and operations may include others not illustrated in FIG. 7A and FIG. 7B. In embodiments, the signals and operations may not include every signal and operation illustrated in FIG. 7A and FIG. 7B. In embodiments, the signals and operations may be implemented in a different order than that illustrated in FIG. 7A and FIG. 7B.

Such and other embodiments are contemplated to be within the scope of the present disclosure.

Figure 8A:
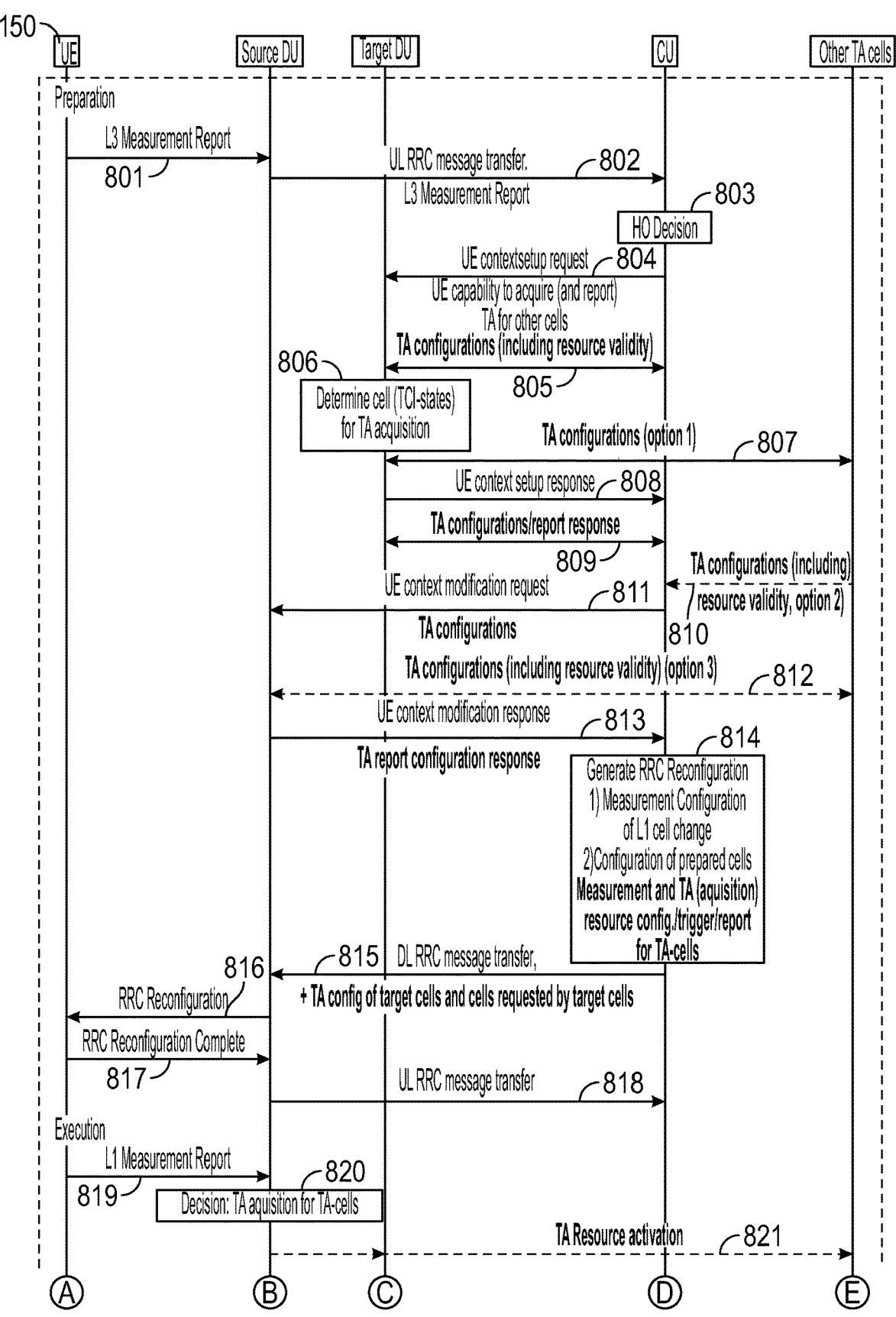
FIGS. 8A and 8B are diagrams of another example embodiment of signals and operations among a UE, a CU, a source DU, a target DU, and other cells, according to one illustrated aspect of the disclosure.
Figure 8B:
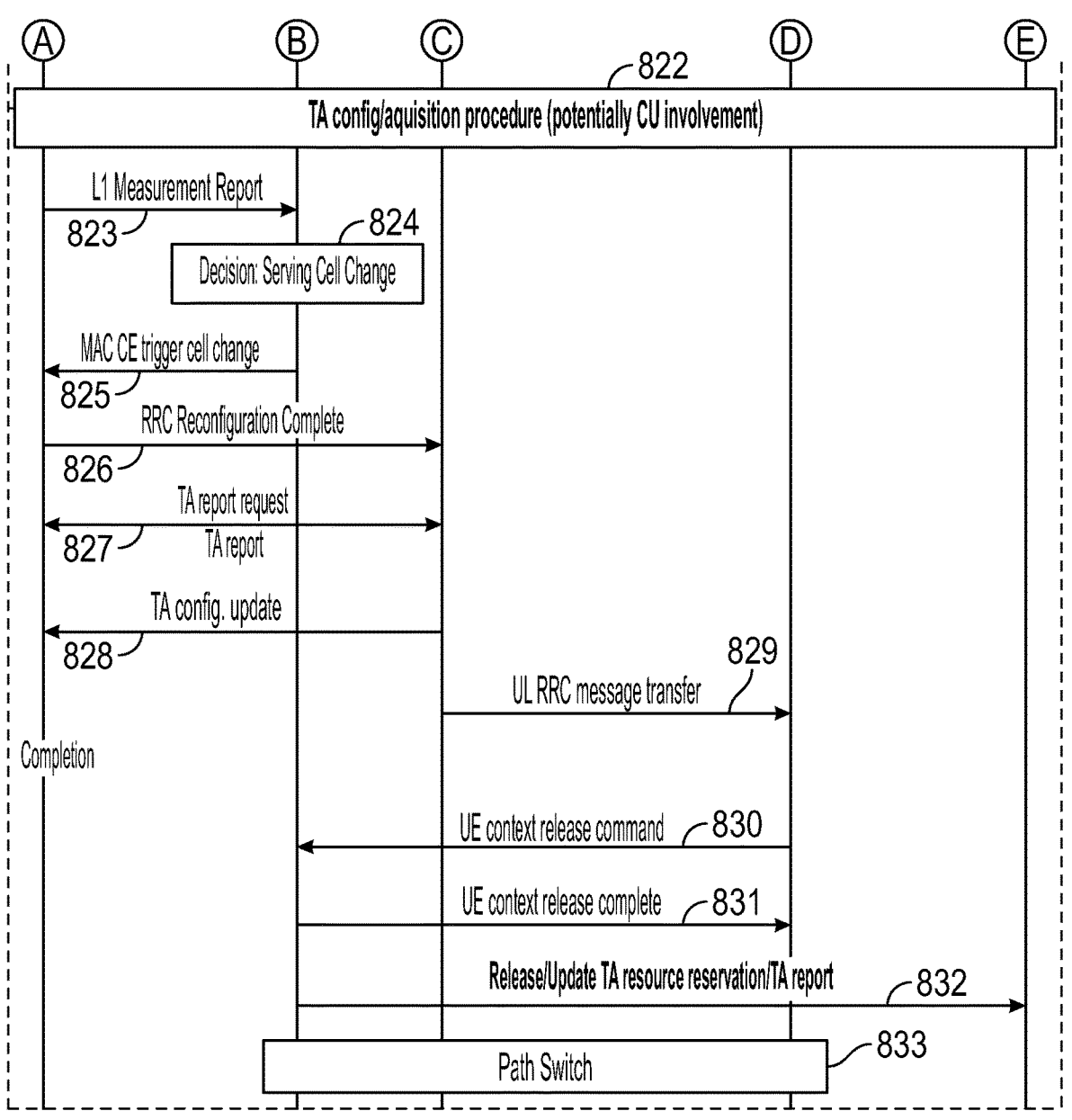

Referring now to FIG. 8A and FIG. 8B, example signals and operations for TA resource and report management are shown in relation to an inter-DU handover procedure. The handover procedure is merely illustrative, and it is contemplated that aspects of the disclosed technology may be applied to other procedures involving TA acquisition, such as, without limitation, dual connectivity, carrier aggregation, mTRP, fast handover, and/or dynamic point switching, among others. Additionally, the inter-DU scenario is illustrative, and aspects of the present disclosure may be applied to intra-DU and/or inter-CU scenarios, as well. Where the source DU and target DU are supported by different CUs, the source DU may be supported by a source CU and the target DU may be supported by a target CU, which can communicate via an Xn interface. As mentioned above, the terms "transmit towards", "receive from", and "cooperate with" (and their variations), include communications that may or may not involve communications through one or more intermediate devices or nodes. It is intended that any description referring to a DU shall also be treated as though the description refers to a network node which supports at least one of DU functionality or a layer 2 protocol of a radio access network (RAN). It is intended that any description referring to a CU shall also be treated as though the description refers to a network node which supports at least one of CU functionality or a layer 3 protocol of a radio access network (RAN).

Aspects of the signals and operations of FIG. 8A and FIG. 8B are the same as or similar to various signals and operations of FIG. 6A, FIG. 6B, FIG. 7A, and FIG. 7B. For clarity, the signals and operations of FIG. 8A and FIG. 8B will be described in detail. Aspects of FIG. 8A and FIG. 8B are intended to be usable with aspects of FIG. 6A, FIG. 6B, FIG. 7A, and FIG. 7B.

The following paragraphs describe various signals and operations. It will be understood that the described signals may have associated operations and the described operations may have associated signals. Accordingly, a described signal may also be an operation and a described operation may also be a signal.

The benefit of the disclosed technology is to enhance RACH-based timing advance (TA) acquisition resource allocation and provide methods for TA reporting during mobility. The disclosed technology supports LTM as well as other mobility scenarios where the user equipment apparatus (UE) 150 needs to acquire TA before cell switch/cell addition.

FIGS. 8A and 8B illustrate aspects of radio resource allocation and indications (e.g., random access resources) for early TA acquisition, update (maintenance), and reporting during mobility. As used herein, the term "TA cells" refers to cells which are subject to TA acquisition and may refer to either or both of: 1) candidate target cells for which a source DU/CU would like the UE perform TA acquisition; or 2) a set of other cells requested by a candidate target cell for TA acquisition by the UE (e.g., because the candidate target cell may establish CA, DC or multi-TRP, etc.). For the latter, the candidate target cell may be referred to as a "parent target cell" and the set of other cells requested by parent target cell(s) may be referred to as "other TA cells."

Prior to signal 801, the UE has established a connection with a DU (i.e., source DU) that supports the serving cell which serves the UE and has established a (logical) connection with the CU that supports the DU.

For signal 801, the UE transmits an L3 measurement report towards the source DU, and the source DU receives the L3 measurement report from the UE. Persons skilled in the art will understand an L3 measurement report, which may include averaged measurement samples of reference signals for a serving cell, for example. An L3 measurement report may indicate, for example, that a UE is nearing an edge of a cell and, thus, handover procedures should be initiated. For signal 802, the source DU forwards the L3 measurement report using uplink (UL) RRC message transfer by transmitting the L3 measurement report towards the CU, and the CU receives the L3 measurement report from the source DU. For operation 803, the CU performs a handover (HO) decision, based on the L3 measurement report, about whether a handover should be prepared. For the illustrated embodiment, the CU decides that a handover should be prepared.

The following will describe signals 804, 805, and 808.

For signal 804, the CU transmits a UE context setup request towards the target DU to prepare the target DU for handover by setting up the UE context in the target DU. The target DU receives the UE context setup request from the CU and sets up the UE context. For signal 805, the CU and the target DU cooperate regarding TA configurations and resource validity for the UE to acquire TA for the target cell supported by the target DU. Further aspects of the cooperation for signal 805 will be described below herein. For signal 808, the target DU provides an acknowledgement to the UE context setup request by transmitting a UE context setup response towards the CU, and the CU receives the UE context setup response from the target DU.

Although one target DU is illustrated, there may be more than one target DU if there are multiple candidate target cells. The signals at 804, 805, and 808 may be used for each target DU and for multiple candidate target cells. The description below will refer to candidate target cell(s) to indicate there may be one candidate target cell or multiple candidate target cells and, where appropriate, will refer to target DU(s) supporting the candidate target cell(s). If a target DU and the source DU are supported by different CUs, the CUs may communicate using an Xn interface. For convenience, only one CU is illustrated (a CU supporting the source DU), but it is intended for the disclosed technology to apply to multi-CU situations, as well.

The following will describe signals and operations 804, 806, 807, and 809.

Referring again to signal 804, the CU also informs the target DU(s)/target cell(s) about the UE capability to acquire/maintain TA of other cells before a cell switch and potentially report them after cell switch. The CU transmits this information towards the target DU, and the target DU receives this information from the CU. For operation 806, the target DU determines, based on the information about UE capability, a set of other cells/TRPs (or TCI-states) for which the target DU would like the UE to acquire TA. As described above, the set of other cells is referred to as other TA cells. For signal 807, the target DU and the DU(s) supporting the TA cells coordinate regarding TA configurations and resource validity for the UE to acquire TA for the other TA cells. Further aspects of the cooperation for signal 807 will be described later herein. For signal 809, the target DU informs the CU about TA configurations and resources of the other TA cells for the UE to acquire TA for the other TA cells. The target DU transmits this information towards the CU, and the CU receives this information from the target DU.

In embodiments, rather than or in addition to the coordination being carried out by the target DU with the TA cells (for signal 807), the CU may carry out the coordination with the DU(s) supporting the TA cells (for signal 810), and/or the source CU may carry out the coordination with the DU(s) supporting the TA cells (for signal 812). Any of the signals 807, 810, and 812, or combinations of them, may be used for coordinating TA configurations and resource validity for the UE to acquire TA for the other TA cells. These coordination will be described in more detail later herein.

For signal 811, the CU coordinates TA configurations with the source DU by transmitting a UE context modification request towards the source DU, and the source DU receives the UE context modification request from the CU. The TA configuration includes the cells for which the UE shall acquire the TA before cell switch (i.e., the TA cells). As mentioned above, for signal 812, the source DU may carry out the coordination with the DU(s) supporting the other TA cells (for signal 812) regarding TA configurations and resource validity for the UE to acquire TA for the TA cells. The source DU receives the UE context modification request from the CU and modifies the UE context, if needed. For signal 813, the source DU provides an acknowledgment by transmitting a UE context modification response towards the CU, and the CU receives the UE context modification response from the source DU. Signal 813 may also include a TA report configurations response, which may include TA configurations and resource validity from signal 812. The source DU may transmit the TA report configurations response towards the CU, and the CU may receive the TA report configurations response from the source DU.

For operation 814, the CU creates an RRC reconfiguration message, which includes a TA configuration for the target cell(s) and for the other cell(s) requested by the target cell(s). The TA configuration includes one or more of: a measurement configuration for a L1 cell change, a configuration of prepared target cell(s), and a measurement and TA acquisition resource configuration and trigger for the target cell(s). The TA configuration may, for example, specify the method for a UE to acquire TA. The TA configuration may specify other TA management options, such as those described above in connection with FIG. 6A and FIG. 6B. Such aspects of FIG. 6A and FIG. 6B are usable for aspects of FIG. 8A and FIG. 8B.

For signal 815, the CU transmits the RRC reconfiguration message towards the source DU using a downlink (DL) RRC message transfer, and the source DU receives the RRC reconfiguration message from the CU. As mentioned above, the RRC reconfiguration message may include the TA configuration for TA cells. For signal 816, the source DU transmits the RRC reconfiguration message towards the UE to forward it to the UE, and the UE receives the RRC reconfiguration message from the source DU. The UE performs a reconfiguration based on the RRC reconfiguration message. For signal 817, the UE responds by transmitting a RRC reconfiguration complete message towards the source DU using an uplink (UL) RRC message transfer, and the source DU receives the RRC reconfiguration complete message from the UE. For signal 818, the source DU transmits the RRC reconfiguration complete message towards the CU to forward it to the CU, and the CU receives the RRC reconfiguration complete message from the source DU. In embodiments, the signals 815-818 may be described as part of a logical connection between the UE and the CU, such that the CU transmits the RRC message towards the UE, and the UE receives the RRC message from the CU.

In embodiments, the signals and operations 801-818 described above may be referred to as a preparation phase. After the preparation phase is an execution phase.

In the execution phase, the UE, based on its configuration, provides periodic L1 measurement reports. Persons skilled in the art will understand L1 measurements. For signal 819, the UE periodically transmits the L1 measurement reports towards the source DU, and the source DU receives the periodic L1 measurement reports from the UE.

For operation 820, the source DU decides, based on the received L1 measurement report, whether to trigger the UE to acquire TA for the TA cells (i.e., the candidate target cell(s) and the other TA cells). The source DU may decide to trigger TA acquisition if, for example, L1 measurements move below or above a measurement threshold, among other criteria. In the illustration, the source DU decides to trigger TA acquisition for the TA cells.

For signal 821, the source DU activates TA acquisition resources of the TA cells (i.e., the target cell(s) and the other TA cells) for the UE to acquire TA.

For operation 822, UE acquires TA for the TA cells using the TA acquisition method specified in the RRC reconfiguration message of operation 814. As will be described below, TA may be acquired based on random access (RA) procedure (either CFRA or CBRA), such as, without limitation, a physical downlink control channel (PDCCH) ordered RA procedure, UE-triggered RA procedure, and/or a higher layer triggered RA procedure from a network node (other than a L3 handover command), among others. In embodiments, TA may be acquired based on non-RA procedure methods, such as, without limitation, sounding (such as those in LTE), and/or UE-based TA measurement (including UE based TA measurement with one TAC from serving cell), among others. Such RA-based and non-RA-based methods for TA acquisition are within the scope of the present disclosure. After operation 822, the UE will have TA values for the TA cells before a cell switch is triggered.

For signal 823, the UE continues L1 measurement reporting and periodically transmits L1 measurement reports towards the source DU, and the source DU receives the periodic L1 measurement reports from the UE.

For operation 824, the source DU decides whether the UE should change serving cells. In embodiments, the source DU may decide that the UE should change serving cells if the L1 measurements move below or above a threshold, for example. Once the source DU decides that the UE should be handed over to a cell (e.g., target cell supported by target DU), the source DU triggers the cell switch using a cell switch command (e.g., a MAC CE).

For signal 825, the cell switch command (e.g., MAC CE) is transmitted by the source DU towards the UE, and the UE receives the cell switch command (e.g., MAC CE) from the source DU. In embodiments, the cell switch command may contain the TA value for the target cell. In embodiments, the cell switch command may contain a TA configuration for the UE to use during and/or after the cell switch. The TA configuration for the UE to use during and/or after the cell switch is similar to those described in connection with FIG. 6A and FIG. 6B. Such aspects of FIG. 6A and FIG. 6B are usable with the cell switch command of signal 825.

In response to the cell switch command, the UE applies the RRC configuration for the target cell of the target DU indicated by the cell switch command, to switch to the target DU/target cell as the serving cell. For signal 826, to initiate communication with the target DU, the UE transmits an RRC reconfiguration complete message towards the target DU using already configured uplink (UL) resources, and the target DU receives the RRC reconfiguration complete message from the UE. (Signals 827 and 828 will be described below.) For signal 829, the target DU forwards the RRC reconfiguration complete message using UL RRC message transfer to transmit the RRC reconfiguration complete message towards the CU, and the CU receives the RRC reconfiguration complete message from the target DU. For signal 830, the CU transmits a UE context release command towards the source DU to release the UE context from the source DU, and the source DU receives the UE context release command from the CU. The source DU releases the UE context in response to the UE context release command. For signal 831, the source DU transmits a UE context release complete message towards the CU, and the CU receives the UE context release complete message from the source DU. For operation 832, the source DU releases and updates TA resource reservation from the other TA cells. For operation 833, the CU performs path switch to the target DU as the new DU supporting the serving cell.

The following will now provide more details regarding various signals and operations of FIG. 8A and FIG. 8B.

In accordance with aspects of the present disclosure, and as described above, for signals 805, 807, 809, and 812, the signals include TA resources that include a validity indication. In embodiments, the CU may configure the UE with the number of trials/attempts for using early TA CFRA resources (within a sliding window). After the number of trials/attempts for using CFRA resources is reached, the UE stops using these CFRA resources and may inform the CU.

In accordance with aspects of the present disclosure, for signal 821, TA resource activation message can be sent from the source DU to the DU(s) supporting the other TA cell(s). In embodiments, the source DU can send the activation message to the target DU. The target DU can then send the message to its own other TA cells. A similar approach may be applied for the TA resource release message.

The following describes how TA configurations are provided to the UE and how TA acquisition is triggered.

In embodiments, for a RA-based TA acquisition, the TA-associated RA configuration of a TA cell (e.g., a target cell) may be provided as a part of the corresponding candidate cell configuration given to the UE (signals 815, 816) during the handover preparation phase. In such embodiments, the source DU may later indicate the candidate cell to the UE for TA acquisition (operation 822), e.g., within a physical downlink control channel (PDCCH) order. Such embodiments may be applicable to both CFRA and CBRA.

In embodiments, the UE may be initially configured to perform RA over the RA occasion(s) of the highest measured beam (L1 or L3), and hence the CU configures the UE with the target cell ID and RA preamble ID with a PDCCH order. For example, the CU may transmit, towards the UE, a list of contention free random access (CFRA) resources for the TA acquisition. The list of CFRA resources may include a target cell ID, a RA preamble ID, and a random access occasion and RA transmit power control parameters. The CU then may transmit, towards the UE, the PDCCH order. The UE may select, for the TA acquisition, a valid CFRA resource among the list of CFRA resources in response to the transmission. Such embodiments may be applicable to CFRA.

In embodiments, the UE may be configured such that the selection of specific CFRA resource or the triggering of sending RA for TA acquisition can provide implicit information to the TA-cell about the TA-cell channel quality (or quality difference with respect to the serving cell) and/or supplementary information about the HO procedure (e.g., indication HO probability to the target cell).

In embodiments, triggering the TA acquisition for a target cell may implicitly trigger TA acquisition for the other TA cell(s) requested by the target cell, as well. Such embodiments may be applicable to both CFRA and CBRA.

In embodiments, the source DU may include the partial or full random-access configurations directly (or configuration ID) within the PDCCH order. Such embodiments may be applicable to both CFRA and CBRA.

In embodiments, each TA cell may broadcast TA-associated RA configurations (e.g., as part of SIB). The CU and source DU then send cell-ID to the UE to trigger TA acquisition. Such embodiments may be applicable to both CFRA and CBRA.

In embodiments, the DU supporting a TA cell may reject the request for CFRA resources and may provide a CBRA configuration.

The following describes random access configurations of a TA cell for TA acquisition by the UE, for scenarios where specific random-access resources (e.g., RA preamble, random access occasions (beams) in time and frequency) are provided for TA acquisition (e.g., CFRA).

In embodiments, a TA cell (in coordination with a source DU or a target DU supporting a parent target cell) may provide a timer on the validity of early TA CFRA resources for early TA acquisition.

In embodiments, the source cell (or parent target cell) may inform the TA-cell about the required validity time of the TA resources.

In embodiments, the providing of configurations implies that TA resources are valid for a certain number of RA transmissions during a predefined time.

In embodiments, the provided configurations entail information implying that TA resources are valid either: before UE receives the cell switch command, before switching to the target cell, or after moving to the target cell. In case of after moving to the target cell, the source cell sends the resource allocation information to the target cell.

In embodiments, the CU and source DU (or the DU supporting a parent target cell) may send an activation or release message to the TA cell to release the early-TA CFRA resources, respectively.

In embodiments, a parent target cell informs its own other TA cells about the activation and/or the release of CFRA resources.

In embodiments, if CFRA resources are configured, activated, and/or used for TA acquisition, the target cell may implicitly know whether RAR response is to be provided for the CFRA transmission directly to the UE and/or whether the TA value is to be transmitted to the UE's serving cell. This may also be configurable per resource. The RAR reception configuration may be included in the TA associated RACH configuration or PDCCH order for the UE, enabling the UE to know where to decode the RAR response. A configuration containing, for example, common CORESET and search space configurations to receive a RAR message from the target cell may be provided to the UE, e.g., in the candidate cell configuration.

In embodiments, the validity of CFRA resources of other TA cells requested by the parent target cell depends on the validity of resources of the requested target cell. In this case, TA acquisition/maintenance/update of TA cells depends on the TA status of the parent target cell (e.g., the UE may be configured to reset the TA timer and not to acquire/require TA for TA cell in case it stops TA acquisition, update or rest it for parent target cell).

In embodiments, the provided TA resources are valid until the target cell receives the UE context release message (signal 830).

The following describes random access configurations of a TA cell for TA acquisition by the UE, for scenarios involving a gap configuration for inter-frequency preamble transmission and/or random access response (RAR) reception. Such embodiments may be applicable to both CFRA and CBRA.

In scenarios where the RA occasion of a candidate target cell is on a different frequency (inter-frequency scenario) compared to the UE's active frequency band (e.g., BWP) with the serving cell, the UE may also be configured with gaps (e.g., TAAcquisitionGap similar to measurement gaps) to perform RF tuning and preamble transmission. Similarly, if the UE is configured to receive a RAR (or a similar message containing the TA) from the candidate target cell on a different frequency, then additional gaps may need to be configured to the UE. This may be configured by the source DU (if the source DU has the information of the candidate target cell's RA configuration) or the CU.

The following describes a random access response (RAR) that includes a TA command. Such embodiments may be applicable to both CFRA and CBRA.

In embodiments, the TA cell may send the TA value directly to the UE. The UE may then be provided with a different configuration for searching/decoding the transmitted TA command, than the legacy RA response. In embodiments, the TA cell may send a modified (i.e., a shorter) random access response (MSG2) to the UE including TA value (and potentially TAT or validity of acquired TA). This MSG2 may include additional resources (potentially including a resource validity timer) for UE UL transmission after handover. In embodiments, the TA value can be transmitted as part of DCI (from source cell or TA cell).

The following describes UE behavior with respect to a received RAR (TA command). Such embodiments may be applicable to both CFRA and CBRA.

In embodiments, the UE may be configured to send an ACK or NACK to RAR directly to the TA cell or to the parent target cell.

In embodiments, the UE may be configured to send the ACK or NACK, of other TA cells requested by the target cell, directly to the target cell after cell switch.

In embodiments, the network may provide the UE with specific configurations (i.e., specific UL resources, or feedback ID) to send the ACK or NACK to the source cell.

In embodiments, the UE may be configured to send the TA information that has been acquired (or confirmation of acquisition) with L1 measurement report (signal 823) or additional field in MAC-CE (signal 825).

In embodiments, the source cell may inform the TA cell about the TA acquisition status (the TA value has been acquired by the UE or TA value has not been yet acquired by the UE), and request to retransmit the TA command (in case of failure, the source cell may request the TA value to be retransmitted to the target cell).

In accordance with aspects of the present disclosure, an embodiment of operations from the perspective of the UE is as follows. In embodiments, the UE establishes a connection with a control network node (e.g., CU) via a serving cell, where the control network node supporting at least one of central unit-control plane (CU-CP) functionality or a layer 3 protocol of a radio access network, where the serving cell is supported by a source network node (e.g., source DU) which supports at least one of distributed unit (DU) functionality or a layer 2 protocol of the radio access network; receives, from at least one of the control network node or the source network node, a plurality of timing advance (TA) cell configurations for a set of timing advance (TA) cells, where the plurality of TA cell configurations comprises a TA-associated random access (RA) configuration for TA acquisition for a specific TA cell of the plurality of TA cells, where the set of TA cells comprises at least one of: first TA cells comprising candidate target cells with which the UE may connect, or other TA cells which are requested by at least one of the candidate target cells and which the UE may connect with in case the UE connects with the at least one of the candidate target cells; and acquire TA for the specific TA cell based on the TA-associated RA configuration and an associated TA acquisition request.

In accordance with aspects of the present disclosure, an embodiment of operations from the perspective of the CU is as follows. In embodiments, the CU establishes a connection with a user equipment apparatus (UE) via a serving cell; determines a set of timing advance cells (TA cells) for timing advance (TA) acquisition by the UE, the set of TA cells comprising at least one of: first TA cells comprising candidate target cells with which the UE may connect, or other TA cells which are requested by at least one of the candidate target cells and which the UE may connect with in case the UE connects with the at least one of the candidate target cells; coordinate, with a TA network node (e.g., target DU) which supports a TA cell of the set of TA cells and which supports at least one of distributed unit (DU) functionality or a layer 2 protocol of the radio access network, on a TA-associated random access (RA) configuration for the TA cell; and transmit, towards the UE, for timing advance (TA) acquisition, a TA configuration comprising the TA-associated RA configuration for the TA cell.

In accordance with aspects of the present disclosure, an embodiment of operations from the perspective of the source DU is as follows. In embodiments, the source DU establishes a connection with a user equipment apparatus (UE) via the serving cell; receives, from a control network node (e.g., CU) which supports at least one of control unit-control plane (CU-CP) functionality or a layer 3 protocol of a radio access network, information regarding a set of timing advance cells (TA cells) subject to timing advance (TA) acquisition by the UE, the set of TA cells comprising at least one of: first TA cells comprising candidate target cells with which the UE may connect, or other TA cells which are requested by at least one of the candidate target cells and which the UE may connect with in case the UE connects with the at least one of the candidate target cells; coordinates, with at least one TA network node (e.g., target DU) which supports the set of TA cells and which supports at least one of distributed unit (DU) functionality or a layer 2 protocol of a radio access network, on a time period corresponding to valid contention-free random access (CFRA) resources for the UE to acquire TA for the TA cells prior to a handover, where the time period includes a start point, an end point, and a duration.

In accordance with aspects of the present disclosure, an embodiment of operations from the perspective of the target DU is as follows. In embodiments, the target DU determines other TA cells which the UE may connect with in case the UE connects with the first TA cell; coordinates, with at least one TA network node which supports the other TA cells and which supports at least one of distributed unit (DU) functionality or a layer 2 protocol of a radio access network, on a time period corresponding to valid contention-free random access (CFRA) resources for the UE to acquire TA for the other TA cells prior to a handover, where the time period includes a start point, an end point, and a duration.

The signals and operations of FIG. 8A and FIG. 8B are merely illustrative, and variations are contemplated to be within the scope of the present disclosure. For example, the signals and operations may assume one TA value per physical cell ID (PCI). In embodiments, to cover multi-TRP (multi-transmit receipt point) scenarios, the UE may be configured and required to acquire multiple Tas for a PCI, such as, for example, different TA values for different sets of TCI-states (transmission configuration indicator states). In embodiments, the signals and operations may include others not illustrated in FIG. 8A and FIG. 8B. In embodiments, the signals and operations may not include every signal and operation illustrated in FIG. 8A and FIG. 8B. In embodiments, the signals and operations may be implemented in a different order than that illustrated in FIG. 8A and FIG. 8B. Such and other embodiments are contemplated to be within the scope of the present disclosure.

Further embodiments of the present disclosure include the following examples.

Example 6.1.1. A network node that supports at least one of central unit control plane (CU-CP) functionality or a layer 3 protocol of a radio access network, the network node comprising:

at least one processor; and at least one memory storing instruction which, when executed by the at least one processor, cause the network node at least to:

establish a connection with a user equipment apparatus (UE) via a serving cell;

determine a radio resource control (RRC) message comprising configuration information relating to timing advance, the configuration information configured to prepare the UE for at least one candidate target cell with which the UE may connect; and transmit, towards the UE, prior to the UE connecting with any of the at least one candidate target cell, the RRC message comprising the configuration information.

Example 6.1.2. The network node of Example 6.1.1, wherein the configuration information relating to timing advance relates to at least one of: timing advance measurement, timing advance acquisition resource, timing advance trigger, time alignment timer, timing advance update, or timing advance reporting.

Example 6.1.3. The network node of Example 6.1.2, wherein the RRC message is configured to prepare the UE for at least one of: a handover, carrier aggregation, multiple transmission and reception points, dual connectivity, fast handover, or dynamic point switching.

Example 6.1.4. The network node of Example 6.1.1, wherein the instructions, when executed by the at least one processor, further cause the network node at least to:

receive, from the UE, a measurement report;

decide, based on the measurement report, to configure L1/L2 triggered mobility (LTM); and configure LTM at a first distinct network node which supports at least one of distributed unit (DU) functionality or a layer 2 protocol of the radio access network and which supports the serving cell.

Example 6.1.5. The network node of Example 6.1.4, wherein the RRC message is configured to cause the UE to select a set of candidate target cells and initiate timing advance acquisition for the set of candidate target cells.

Example 6.1.6. The network node of Example 6.1.5, wherein the set of candidate target cells is selected based on at least one of: measurement quality above a predefined value, measurement quality above a threshold with respect to the serving cell for a predefined time duration, or measurement quality above a threshold with respect to the serving cell for a predefined number of samples.

Example 6.1.7. The network node of Example 6.1.5, wherein the instructions, when executed by the at least one processor, further cause the network node at least to:

coordinate with a second distinct network node, which supports at least one of DU functionality or a layer 2 protocol of the radio access network and which supports a target cell among the set of candidate target cells, regarding timing advance management before, during, or after a cell switch in connection with the LTM.

Example 6.1.8. The network node of Example 6.1.7, wherein in coordinating with the second distinct network node, the instructions, when executed by the at least one processor, further cause the network node at least to:

perform at least one of:

receive, from the second distinct network node associated with the target cell, an indication of whether the UE may maintain the timing advance values, acquired for the set of candidate target cells before the cell switch, during or after the cell switch;

receive, from the second distinct network node associated with the target cell, an indication of whether the UE may maintain a subset of the timing advance values during or after the cell switch, the subset of timing advance values corresponding to a subset of the set of candidate target cells which have at least one of:

measurement quality above a predefined value, measurement quality above a threshold with respect to the serving cell for a predefined time duration, measurement quality above a threshold with respect to the serving cell for a predefined number of samples, measurement quality above a threshold with respect to the target cell for a predefined time duration, measurement quality above a threshold with respect to the target cell for a predefined number of samples, measurement quality above a threshold, with respect to a cell supported by the second distinct network node, for a predefined time duration, or measurement quality above a threshold, with respect to a cell supported by the second distinct network node, for a predefined number of samples; or receive, from the second distinct network node, an indication of whether the UE should expire any running time alignment timers upon the cell switch.

Example 6.1.9. The network node of Example 6.1.5, wherein the instructions, when executed by the at least one processor, further cause the network node at least to:

transmit, towards the UE, additional configuration information relating to reacquiring timing advance when time alignment timers expire during at least one of: after receiving a cell switch command in connection with the LTM, during a cell switching procedure after receiving the cell switch command, or during a predefined time duration after switching to a target cell.

Example 6.1.10. The network node of Example 6.1.9, wherein the additional configuration information is configured to prepare the UE to, at least one of:

not reacquire timing advance for a candidate target cell among the set of candidate target cells if the candidate target cell has at least one of: measurement quality below a predefined value, measurement quality below a threshold with respect to the serving cell, or measurement quality below a threshold with respect to at least one other candidate target cell among the set of candidate target cells;

not reacquire timing advance for the candidate target cell;

use a different method to reacquire timing advance;

restart the time alignment timers; or use new time alignment timers.

Example 6.1.11. A processor-implemented method comprising:

establishing a connection with a user equipment apparatus (UE) via a serving cell;

determining a radio resource control (RRC) message comprising configuration information relating to timing advance, the configuration information configured to prepare the UE for at least one candidate target cell with which the UE may connect; and transmitting, towards the UE, prior to the UE connecting with any of the at least one candidate target cell, the RRC message comprising the configuration information.

Example 6.1.12. The processor-implemented method of Example 6.1.11, wherein the configuration information relating to timing advance relates to at least one of: timing advance measurement, timing advance acquisition resource, timing advance trigger, time alignment timer, timing advance update, or timing advance reporting.

Example 6.1.13. The processor-implemented method of Example 6.1.12, wherein the RRC message is configured to prepare the UE for at least one of: a handover, carrier aggregation, multiple transmission and reception points, dual connectivity, fast handover, or dynamic point switching.

Example 6.1.14. The processor-implemented method of Example 6.1.11, further comprising:

receiving, from the UE, a measurement report;

deciding, based on the measurement report, to configure L1/L2 triggered mobility (LTM); and configuring LTM at a first distinct network node which supports at least one of distributed unit (DU) functionality or a layer 2 protocol of the radio access network and which supports the serving cell.

Example 6.1.15. The processor-implemented method of Example 6.1.14, wherein the RRC message is configured to cause the UE to select a set of candidate target cells and initiate timing advance acquisition for the set of candidate target cells.

Example 6.1.16. The processor-implemented method of Example 6.1.15, wherein the set of candidate target cells is selected based on at least one of: measurement quality above a predefined value, measurement quality above a threshold with respect to the serving cell for a predefined time duration, or measurement quality above a threshold with respect to the serving cell for a predefined number of samples.

Example 6.1.17. The processor-implemented method of Example 6.1.15, further comprising:

coordinating with a second distinct network node, which supports at least one of DU functionality or a layer 2 protocol of the radio access network and which supports a target cell among the set of candidate target cells, regarding timing advance management before, during, or after a cell switch in connection with the LTM.

Example 6.1.18. The processor-implemented method of Example 6.1.17, coordinating with the second distinct network node comprises:

performing at least one of:

receiving, from the second distinct network node associated with the target cell, an indication of whether the UE may maintain the timing advance values, acquired for the set of candidate target cells before the cell switch, during or after the cell switch;

receiving, from the second distinct network node associated with the target cell, an indication of whether the UE may maintain a subset of the timing advance values during or after the cell switch, the subset of timing advance values corresponding to a subset of the set of candidate target cells which have at least one of:

measurement quality above a predefined value, measurement quality above a threshold with respect to the serving cell for a predefined time duration, measurement quality above a threshold with respect to the serving cell for a predefined number of samples, measurement quality above a threshold with respect to the target cell for a predefined time duration, measurement quality above a threshold with respect to the target cell for a predefined number of samples, measurement quality above a threshold, with respect to a cell supported by the second distinct network node, for a predefined time duration, or measurement quality above a threshold, with respect to a cell supported by the second distinct network node, for a predefined number of samples; or receive, from the second distinct network node, an indication of whether the UE should expire any running time alignment timers upon the cell switch.

Example 6.1.19. The processor-implemented method of Example 6.1.15, further comprising:

transmitting, towards the UE, additional configuration information relating to reacquiring timing advance when time alignment timers expire during at least one of: after receiving a cell switch command in connection with the LTM, during a cell switching procedure after receiving the cell switch command, or during a predefined time duration after switching to a target cell.

Example 6.1.20. The processor-implemented method of Example 6.1.19, wherein the additional configuration information is configured to prepare the UE to, at least one of:

not reacquire timing advance for a candidate target cell among the set of candidate target cells if the candidate target cell has at least one of: measurement quality below a predefined value, measurement quality below a threshold with respect to the serving cell, or measurement quality below a threshold with respect to at one other candidate target cell among the set of candidate target cells;

not reacquire timing advance for the candidate target cell;

use a different method to reacquire timing advance;

restart the time alignment timers; or use new time alignment timers.

Example 6.2.1. A network node which supports at least one of distributed unit (DU) functionality or a layer 2 protocol of a radio access network and which supports a cell, the network node comprising:

at least one processor; and at least one memory storing instruction which, when executed by the at least one processor, cause the network node at least to:

establish a connection with a user equipment apparatus (UE) via the cell acting as a serving cell;

receive, from a control network node which supports at least one of central unit control plane (CU-CP) functionality or a layer 3 protocol of the radio access network, a L1/L2 triggered mobility (LTM) configuration related to the UE; and transmit, towards the UE, prior to the UE connecting with any candidate target cell, a message comprising timing advance-related configuration information.

Example 6.2.2. The network node of Example 6.2.1, wherein the instruction, when executed by the at least one processor, further cause the network node at least to:

coordinate with a distinct network node, which supports at least one of DU functionality or a layer 2 protocol of the radio access network and which supports a target cell, regarding timing advance management before, during, or after a cell switch in connection with the LTM.

Example 6.2.3. The network node of Example 6.2.2, wherein in coordinating with the distinct network node, the instruction, when executed by the at least one processor, further cause the network node at least to:

perform at least one of:

receive, from the distinct network node, an indication of whether the UE may maintain timing advance values, acquired for a set of candidate target cells before a cell switch, during or after the cell switch;

receive, from the distinct network node, an indication of whether the UE may maintain a subset of the timing advance values during or after the cell switch, the subset of timing advance values corresponding to a subset of the set of candidate target cells which have at least one of:

measurement quality above a predefined value, measurement quality above a threshold with respect to the serving cell for a predefined time duration, measurement quality above a threshold with respect to the serving cell for a predefined number of samples, measurement quality above a threshold with respect to the target cell for a predefined time duration, measurement quality above a threshold with respect to the target cell for a predefined number of samples; or receive, from the distinct network node, an indication of whether the UE may expire any running time alignment timers upon the cell switch.

Example 6.2.4. The network node of Example 6.2.1, wherein the timing advance-related configuration information comprises information relating to reacquiring timing advance when time alignment timers expire during at least one of: after receiving the cell switch command in connection with the LTM, during a cell switching procedure after receiving the cell switch command, or during a predefined time duration after switching to a target cell.

Example 6.2.5. The network node of Example 6.2.4, wherein the information relating to reacquiring timing advance is configured to prepare the UE to, at least one of:

not reacquire timing advance for a candidate target cell among the set of candidate target cells if the candidate target cell has at least one of: measurement quality below a predefined value, measurement quality below a threshold with respect to the serving cell, or measurement quality below a threshold with respect to at one candidate target cell;

not reacquire timing advance for the candidate target cell;

use a different method to reacquire timing advance;

restart the time alignment timers; or use new time alignment timers.

Example 6.2.6. The network node of Example 6.2.1, wherein the instruction, when executed by the at least one processor, further cause the network node at least to:

transmit, towards the UE, a LTM trigger command to trigger a cell switch, the LTM trigger command comprising at least one of:

an indication of whether to expire any running time alignment timers upon the cell switch;

an indication of whether to maintain the timing advances, acquired for the set of candidate target cells before the cell switch, during or after the cell switch;

an indication of whether to maintain and report the timing advances, acquired for the set of candidate target cells before the cell switch, during or after the cell switch;

an indication of whether to maintain and report cell IDs for the set of candidate target cells during or after the cell switch;

an indication of whether to maintain and report the cell IDs and the timing advances during or after the cell switch; or an indication of whether to maintain and report the cell ID and the timing advance for a target cell of the set of candidate target cells if a time alignment timer for the target cell is running and will not expire within a predefined time duration during or after the cell switch.

Example 6.2.7. The network node of Example 6.2.1, wherein the instructions, when executed by the at least one processor, further cause the network node at least to:

receive, from a distinct network node which supports at least one of DU functionality or a layer 2 protocol of a radio access network and which supports a target cell, additional configuration information for the UE to transmit a timing advance report;

transmit, towards the UE, the additional configuration information.

Example 6.2.8. The network node of Example 6.2.7, wherein the additional configuration information indicates inclusion, in the timing advance report, of at least one of:

physical cell IDs (PCI) of a timing advance group (TAG), transmission configuration index states of a TAG, timing advance value associated with a TAG, time alignment timer status associated with a TAG, timing advance acquisition method and UE preference for timing advance acquisition, or UE capabilities for timing advance acquisition, the UE capabilities comprising at least one of: number of TAGs, number of cells, method for acquiring timing advance, or timing advance update limitations.

Example 6.2.9. The network node of Example 6.2.7, wherein the instructions, when executed by the at least one processor, further cause the network node at least to:

receive, from the UE, the timing advance report; and transmit, towards the distinct network node, the timing advance report.

Example 6.2.10. The network node of Example 6.2.9, wherein the timing advance report is received during at least one of: prior to a cell switch to the target cell or during the cell switch to the target cell.

Example 6.2.11. A processor-implemented method comprising:

establishing a connection with a user equipment apparatus (UE) via a cell acting as a serving cell;

receiving, from a control network node which supports at least one of central unit control plane (CU-CP) functionality or a layer 3 protocol of the radio access network, a L1/L2 triggered mobility (LTM) configuration related to the UE; and transmitting, towards the UE, prior to the UE connecting with any candidate target cell, a message comprising timing advance-related configuration information.

Example 6.2.12. The A processor-implemented method of Example 6.2.11, further comprising:

coordinating with a distinct network node, which supports at least one of DU functionality or a layer 2 protocol of the radio access network and which supports a target cell, regarding timing advance management before, during, or after a cell switch in connection with the LTM.

Example 6.2.13. The processor-implemented method of Example 6.2.12, wherein coordinating with the distinct network node comprises:

performing at least one of:

receiving, from the distinct network node, an indication of whether the UE may maintain timing advance values, acquired for a set of candidate target cells before a cell switch, during or after the cell switch;

receiving, from the distinct network node, an indication of whether the UE may maintain a subset of the timing advance values during or after the cell switch, the subset of timing advance values corresponding to a subset of the set of candidate target cells which have at least one of:

measurement quality above a predefined value, measurement quality above a threshold with respect to the serving cell for a predefined time duration, measurement quality above a threshold with respect to the serving cell for a predefined number of samples, measurement quality above a threshold with respect to the target cell for a predefined time duration, measurement quality above a threshold with respect to the target cell for a predefined number of samples; or receiving, from the distinct network node, an indication of whether the UE may expire any running time alignment timers upon the cell switch.

Example 6.2.14. The processor-implemented method of Example 6.2.11, wherein the timing advance-related configuration information comprises information relating to reacquiring timing advance when time alignment timers expire during at least one of: after receiving the cell switch command in connection with the LTM, during a cell switching procedure after receiving the cell switch command, or during a predefined time duration after switching to a target cell.

Example 6.2.15. The processor-implemented method of Example 6.2.14, wherein the information relating to reacquiring timing advance is configured to prepare the UE to, at least one of:

not reacquire timing advance for a candidate target cell among the set of candidate target cells if the candidate target cell has at least one of: measurement quality below a predefined value, measurement quality below a threshold with respect to the serving cell, or measurement quality below a threshold with respect to at one candidate target cell;

not reacquire timing advance for the candidate target cell;

use a different method to reacquire timing advance;

restart the time alignment timers; or use new time alignment timers.

Example 6.2.16. The processor-implemented method of Example 6.2.11, further comprising:

transmitting, towards the UE, a LTM trigger command to trigger a cell switch, the LTM trigger command comprising at least one of:

an indication of whether to expire any running time alignment timers upon the cell switch;

an indication of whether to maintain the timing advances, acquired for the set of candidate target cells before the cell switch, during or after the cell switch;

an indication of whether to maintain and report the timing advances, acquired for the set of candidate target cells before the cell switch, during or after the cell switch;

an indication of whether to maintain and report cell IDs for the set of candidate target cells during or after the cell switch;

an indication of whether to maintain and report the cell IDs and the timing advances during or after the cell switch; or an indication of whether to maintain and report the cell ID and the timing advance for a target cell of the set of candidate target cells if a time alignment timer for the target cell is running and will not expire within a predefined time duration during or after the cell switch.

Example 6.2.17. The processor-implemented method of Example 6.2.11, further comprising:

receiving, from a distinct network node which supports at least one of DU functionality or a layer 2 protocol of a radio access network and which supports a target cell, additional configuration information for the UE to transmit a timing advance report;

transmitting, towards the UE, the additional configuration information.

Example 6.2.18. The processor-implemented method of Example 6.2.17, wherein the additional configuration information indicates inclusion, in the timing advance report, of at least one of:

physical cell IDs (PCI) of a timing advance group (TAG), transmission configuration index states of a TAG, timing advance value associated with a TAG, time alignment timer status associated with a TAG, timing advance acquisition method and UE preference for timing advance acquisition, or UE capabilities for timing advance acquisition, the UE capabilities comprising at least one of: number of TAGs, number of cells, method for acquiring timing advance, or timing advance update limitations.

Example 6.2.19. The processor-implemented method of Example 6.2.17, further comprising:

receiving, from the UE, the timing advance report; and transmitting, towards the distinct network node, the timing advance report.

Example 6.2.20. The network node of Example 6.2.19, wherein the timing advance report is received during at least one of: prior to a cell switch to the target cell or during the cell switch to the target cell.

Example 6.3.1. A network node which supports at least one of distributed unit (DU) functionality or a layer 2 protocol of a radio access network and which supports a target cell, the network node comprising:

at least one processor; and at least one memory storing instruction which, when executed by the at least one processor, cause the network node at least to:

receive, from a control network node which supports at least one of central unit control plane (CU-CP) functionality or a layer 3 protocol of the radio access network, a L1/L2 triggered mobility (LTM) configuration related to a user equipment apparatus (UE), the control network node connected to the UE via a serving cell; and coordinate with a source network node, which supports the serving cell and supports at least one of distributed unit (DU) functionality or a level 2 protocol of the radio access, prior to a cell switch command being sent to the UE, regarding timing advance management before, during, or after a cell switch from the serving cell to the target cell.

Example 6.3.2. The network node of Example 6.3.1, wherein in coordinating with the source network node, the instructions, when executed by the at least one processor, cause the network node at least to:

transmit, towards the source network node, an indication of whether the UE may maintain timing advance values, acquired for a set of candidate target cells before a cell switch, during or after the cell switch;

transmit, towards the source network node, an indication of whether the UE may maintain a subset of the timing advance values during or after the cell switch, the subset of timing advance values corresponding to a subset of the set of candidate target cells which have at least one of:

measurement quality above a predefined value, measurement quality above a threshold with respect to the serving cell for a predefined time duration, measurement quality above a threshold with respect to the serving cell for a predefined number of samples, measurement quality above a threshold with respect to the target cell for a predefined time duration, measurement quality above a threshold with respect to the target cell for a predefined number of samples; or transmit, towards the source network node, an indication of whether the UE may expire any running time alignment timers upon the cell switch.

Example 6.3.3. The network node of Example 6.3.1, wherein in coordinating with the source network node, the instructions, when executed by the at least one processor, cause the network node at least to:

transmit, towards the source network node, configuration information for the UE to transmit a timing advance report.

Example 6.3.4. The network node of Example 6.3.3, wherein the configuration information indicates inclusion, in the timing advance report, of at least one of: physical cell IDs (PCI) of a timing advance group (TAG), transmission configuration index states of a TAG, timing advance value associated with a TAG, time alignment timer status associated with a TAG, timing advance acquisition method and UE preference for timing advance acquisition, or UE capabilities for timing advance acquisition, the UE capabilities comprising at least one of: number of TAGs, number of cells, method for acquiring timing advance, or timing advance update limitations.

Example 6.3.5. The network node of Example 6.3.3, wherein the configuration information comprises allocated uplink resources, the allocated uplink resources enabling the UE, after a cell switch to the target cell, to transmit the timing advance report to the network node using the allocated uplink resources.

Example 6.3.6. The network node of Example 6.3.1, wherein the instructions, when executed by the at least one processor, cause the network node at least to, after the UE switches to the target cell:

transmit, towards the UE, a request for a timing advance report; and receive, from the UE, the timing advance report.

Example 6.3.7. The network node of Example 6.3.6, wherein the request for the timing advance report indicates inclusion, in the timing advance report, of at least one of:

physical cell IDs (PCI) of a timing advance group (TAG), transmission configuration index states of a TAG, timing advance value associated with a TAG, time alignment timer status associated with a TAG, timing advance acquisition method and UE preference for timing advance acquisition, or UE capabilities for timing advance acquisition, the UE capabilities comprising at least one of: number of TAGs, number of cells, method for acquiring timing advance, or timing advance update limitations.

Example 6.3.8. The network node of Example 6.3.6, wherein the instructions, when executed by the at least one processor, cause the network node at least to, after the UE switches to the target cell:

transmit, to the UE, updated configuration information comprising at least one of:

an indication of whether to maintain timing advance values for at least one cell of a set of candidate target cells, an indication to add a cell to a timing advance group, an indication to remove a cell from a timing advance group, an indication to configure a new timing advance group, a time alignment timer configuration, or configurations on a method for acquiring timing advance after time alignment timer expiry.

Example 6.3.9. A processor-implemented method comprising:

receiving, from a control network node which supports at least one of central unit control plane (CU-CP) functionality or a layer 3 protocol of the radio access network, a L1/L2 triggered mobility (LTM) configuration related to a user equipment apparatus (UE), the control network node connected to the UE via a serving cell; and coordinating with a source network node, which supports the serving cell and supports at least one of distributed unit (DU) functionality or a level 2 protocol of the radio access, prior to a cell switch command being sent to the UE, regarding timing advance management before, during, or after a cell switch from the serving cell to the target cell.

Example 6.3.10. The processor-implemented method of Example 6.3.9, wherein coordinating with the source network node comprises:

transmitting, towards the source network node, an indication of whether the UE may maintain timing advance values, acquired for a set of candidate target cells before a cell switch, during or after the cell switch;

transmitting, towards the source network node, an indication of whether the UE may maintain a subset of the timing advance values during or after the cell switch, the subset of timing advance values corresponding to a subset of the set of candidate target cells which have at least one of:

measurement quality above a predefined value, measurement quality above a threshold with respect to the serving cell for a predefined time duration, measurement quality above a threshold with respect to the serving cell for a predefined number of samples, measurement quality above a threshold with respect to the target cell for a predefined time duration, measurement quality above a threshold with respect to the target cell for a predefined number of samples; or transmitting, towards the source network node, an indication of whether the UE may expire any running time alignment timers upon the cell switch.

Example 6.3.11. The processor-implemented method of Example 6.3.9, wherein coordinating with the source network node comprises:

transmitting, towards the source network node, configuration information for the UE to transmit a timing advance report.

Example 6.3.12. The processor-implemented method of Example 6.3.11, wherein the configuration information indicates inclusion, in the timing advance report, of at least one of:

physical cell IDs (PCI) of a timing advance group (TAG),
   transmission configuration index states of a TAG,
   timing advance value associated with a TAG,
   time alignment timer status associated with a TAG,
   timing advance acquisition method and UE preference for timing advance acquisition, or
   UE capabilities for timing advance acquisition, the UE capabilities comprising at least one of: number of TAGs, number of cells, method for acquiring timing advance, or timing advance update limitations.

Example 6.3.13. The processor-implemented method of Example 6.3.11, wherein the configuration information comprises allocated uplink resources, the allocated uplink resources enabling the UE, after a cell switch to the target cell, to transmit the timing advance report to the network node using the allocated uplink resources.

Example 6.3.14. The processor-implemented method of Example 6.3.9, further comprising:

transmitting, towards the UE, a request for a timing advance report; and
   receiving, from the UE, the timing advance report.

Example 6.3.15. The processor-implemented method of Example 6.3.14, wherein the request for the timing advance report indicates inclusion, in the timing advance report, of at least one of:

physical cell IDs (PCI) of a timing advance group (TAG),
   transmission configuration index states of a TAG,
   timing advance value associated with a TAG,
   time alignment timer status associated with a TAG,
   timing advance acquisition method and UE preference for timing advance acquisition, or
   UE capabilities for timing advance acquisition, the UE capabilities comprising at least one of: number of TAGs, number of cells, method for acquiring timing advance, or timing advance update limitations.

Example 6.3.16. The processor-implemented method of Example 6.3.14, further comprising, after the UE switches to the target cell:

transmitting, to the UE, updated configuration information comprising at least one of:
   an indication of whether to maintain timing advance values for at least one cell of a set of candidate target cells,
   an indication to add a cell to a timing advance group,
   an indication to remove a cell from a timing advance group,
   an indication to configure a new timing advance group,
   a time alignment timer configuration, or
   configurations on a method for acquiring timing advance after time alignment timer expiry.

Example 6.4.1. A user equipment apparatus comprising:

means to establish a connection with a first network node via a serving cell, the first network node supporting the serving cell and supporting at least one of distributed unit (DU) functionality or a layer 2 protocol of a radio access network;
   means to receive, from a second network node supporting at least one of central unit control plane (CU-CP) functionality or a layer 3 protocol of the radio access network, a radio resource control (RRC) message comprising configuration information relating to timing advance, the configuration information configured to prepare the user equipment apparatus (UE) for at least one candidate target cell with which the UE may connect, wherein the RRC message is received prior to the UE connecting with any of the at least one candidate target cell; and
   means to implement a configuration based on the configuration information.

Example 6.4.2. The user equipment apparatus of Example 6.4.1, wherein the configuration information relating to timing advance relates to at least one of: timing advance measurement, timing advance acquisition resource, timing advance trigger, time alignment timer, timing advance update, or timing advance reporting.

Example 6.4.3. The user equipment apparatus of Example 6.4.2, wherein the RRC message is configured to prepare the UE for at least one of: a handover, carrier aggregation, multiple transmission and reception points, dual connectivity, fast handover, or dynamic point switching.

Example 6.4.4. The user equipment apparatus of Example 6.4.1, wherein the configuration information is for L1/L2 triggered mobility (LTM), the user equipment apparatus further comprising, prior to receiving a cell switch command from the first network node:
   means to select a set of candidate target cells, and
   means to initiate timing advance acquisition for the set of candidate target cells to acquire timing advance values for the set of candidate target cells.

Example 6.4.5. The user equipment apparatus of Example 6.4.4, wherein the set of candidate target cells is selected based on at least one of: measurement quality above a predefined value, measurement quality above a threshold with respect to the serving cell for a predefined time duration, or measurement quality above a threshold with respect to the serving cell for a predefined number of samples.

Example 6.4.6. The user equipment apparatus of Example 6.4.4, further comprising:

at least one of:
   means to receive, from the first network node, additional configuration indicating whether to maintain the timing advance values, acquired for the set of candidate target cells before a cell switch, during or after the cell switch;
   means to receive, from the first network node, additional configuration indicating whether to maintain a subset of the timing advance values during or after the cell switch, the subset of timing advance values corresponding to a subset of the set of candidate target cells which have at least one of:
   measurement quality above a predefined value,
   measurement quality above a threshold with respect to the serving cell for a predefined time duration,
   measurement quality above a threshold with respect to the serving cell for a predefined number of samples,
   measurement quality above a threshold with respect to a cell, of the set of candidate target cells, for a predefined time duration,
   measurement quality above a threshold with respect to a cell, of the set of candidate target cells, for a predefined number of samples; or
   means to receive, from the first network node, additional configuration indicating whether to expire any running time alignment timers upon the cell switch.

Example 6.4.7. The user equipment apparatus of Example 6.4.1 or Example 6.4.4, further comprising:

means to receive, from the first network node, additional configuration information relating to reacquiring timing advance when time alignment timers expire during at least one of: after receiving the cell switch command in connection with the LTM, during a cell switching procedure after receiving the cell switch command, or during a predefined time duration after switching to a target cell.

Example 6.4.8. The user equipment apparatus of Example 6.4.7, further comprising:

means to implement a second configuration based on the additional configuration information, wherein the second configuration indicates at least one of:

not to reacquire timing advance for a candidate target cell among the set of candidate target cells if the candidate target cell has at least one of: measurement quality below a predefined value, measurement quality below a threshold with respect to the serving cell, or measurement quality below a threshold with respect to at least one other candidate target cell among the set of candidate target cells, not to reacquire timing advance for the candidate target cell, use a different method to reacquire timing advance, restart the time alignment timers, or use new time alignment timers.

Example 6.4.9. The user equipment apparatus of Example 6.4.1 or Example 6.4.4, further comprising:

means to receive, from the first network node, a LTM trigger command to trigger a cell switch, the LTM trigger command comprising at least one of:

an indication of whether to expire any running time alignment timers upon the cell switch;

an indication of whether to maintain the timing advances, acquired for the set of candidate target cells before the cell switch, during or after the cell switch;

an indication of whether to maintain and report the timing advances, acquired for the set of candidate target cells before the cell switch, during or after the cell switch;

an indication of whether to maintain and report cell IDs for the set of candidate target cells during or after the cell switch;

an indication of whether to maintain and report the cell IDs and the timing advances during or after the cell switch; or an indication of whether to maintain and report the cell ID and the timing advance for a target cell of the set of candidate target cells if a time alignment timer for the target cell is running and will not expire within a predefined time duration during or after the cell switch.

Example 6.4.10. The user equipment apparatus of Example 6.4.1 or Example 6.4.4, the user equipment apparatus further comprising:

means to receive, from one of the first network node or a third network node which supports at least one of DU functionality or a layer 2 protocol of a radio access network, additional configuration information for transmitting a timing advance report; and means to transmit, towards one of the first network node or the third network node, the timing advance report.

Example 6.4.11. The user equipment apparatus of Example 6.4.10, wherein the additional configuration information indicates inclusion, in the timing advance report, of at least one of:

timing advance group ID, physical cell IDs (PCI) of a timing advance group (TAG), transmission configuration index states (TCI-state) of a TAG, TCI-state IDs of a TAG, timing advance value associated with a TAG, time alignment timer status associated with a TAG, timing advance acquisition method and UE preference for timing advance acquisition, or UE capabilities for timing advance acquisition, the UE capabilities comprising at least one of: number of TAGs, number of cells, method for acquiring timing advance, or timing advance update limitations.

Example 6.4.12. The user equipment apparatus of Example 6.4.10, wherein the third network node supports a target cell, wherein, prior to a cell switch to the target cell, the additional configuration information is received from the first network node, the additional configuration information comprising uplink resources allocated by the third network node, and wherein, after the cell switch, the timing advance report is transmitted towards the third network node using the uplink resources.

Example 6.4.13. The user equipment apparatus of Example 6.4.10, wherein the third network node supports a target cell, wherein, after a cell switch to the target cell, the additional configuration information is received from the third network node as part of a request for the timing advance report, and wherein, after the cell switch, the timing advance report is transmitted towards the third network node in response to the request for the timing advance report.

Example 6.4.14. The user equipment apparatus of Example 6.4.10, wherein the third network node supports a target cell, and wherein, during at least one of prior to a cell switch to the target cell or during the cell switch to the target cell, the timing advance report is transmitted towards the first network node.

Example 6.4.15. The user equipment apparatus of Example 6.4.10, wherein the third network node supports a target cell, wherein the instructions, when executed by the at least one processor, further cause the user equipment apparatus at least to:

receive, from the third network node, after a cell switch to the target cell, updated configuration information comprising at least one of:

an indication of whether to maintain timing advance values for at least one cell of the set of candidate target cells, an indication to add a cell to a timing advance group, an indication to add a transmission configuration index state (TCI-state) to a timing advance group, an indication to remove a cell from a timing advance group, an indication to remove a TCI-state from a timing advance group, an indication to configure a new timing advance group, a time alignment timer configuration, or configurations on a method for acquiring timing advance after time alignment timer expiry.

The embodiments and aspects disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an aspect," "in aspects," "in various aspects," "in some aspects," or "in other aspects" may each refer to one or more of the same or different aspects in accordance with this disclosure. The phrase "a plurality of" may refer to two or more.

The phrases "in an embodiment," "in embodiments," "in various embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, Python, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

While aspects of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular aspects. Those skilled in the art will envision other modifications within the scope and spirit of the claims appended hereto.

What is claimed is:

1. A user equipment apparatus comprising:
at least one processor; and
at least one memory storing instruction which, when executed by the at least one processor, cause the user equipment apparatus at least to:
establish a connection with a first network node via a serving cell, the first network node supporting the serving cell and supporting distributed unit (DU) functionality and a layer 2 protocol of a radio access network;
receive, from a second network node supporting central unit control plane (CU-CP) functionality and a layer 3 protocol of the radio access network, a radio resource control (RRC) message comprising configuration information relating to timing advance, the configuration information configured to prepare the user equipment apparatus (UE) for at least one candidate target cell with which the UE may connect, wherein the RRC message is received prior to the UE connecting with any of the at least one candidate target cell, the RRC message configured to prepare the UE for a handover, carrier aggregation, multiple transmission and reception points, dual connectivity, fast handover, and dynamic point switching, and
wherein the configuration information relating to timing advance is for L1/L2 triggered mobility (LTM), the configuration information relating to timing advance measurement, timing advance acquisition resource, timing advance trigger, time alignment timer, timing advance update, and timing advance reporting;
prior to receiving a cell switch command from the first network node, select a set of candidate target cells and initiate timing advance acquisition for the set of candidate target cells to acquire timing advance values for the set of candidate target cells, the set of candidate target cells selected based on measurement quality above a predefined value, measurement quality above a first threshold with respect to the serving cell for a predefined time duration, and measurement quality above a second threshold with respect to the serving cell for a predefined number of samples;
receive, from the first network node, additional configuration indicating whether to maintain the timing advance values, acquired for the set of candidate target cells before a cell switch, during or after the cell switch;
receive, from the first network node, additional configuration indicating whether to maintain a subset of the timing advance values during or after the cell switch, the subset of timing advance values corresponding to a subset of the set of candidate target cells, which have:
measurement quality above the predefined value,
measurement quality above the first threshold with respect to the serving cell for the predefined time duration,
measurement quality above the second threshold with respect to the serving cell for the predefined number of samples,
measurement quality above a threshold with respect to a cell, of the set of candidate target cells, for the predefined time duration, and
measurement quality above a threshold with respect to a cell, of the set of candidate target cells, for a predefined number of samples;
receive, from the first network node, additional configuration indicating whether to expire any running time alignment timers upon the cell switch;
receive, from the first network node, a first additional configuration information relating to reacquiring timing advance when time alignment timers expire after receiving the cell switch command in connection with the LTM, during a cell switching procedure after receiving the cell switch command, and during a predefined time duration after switching to a target cell;
receive, from the first network node, a LTM trigger command to trigger a cell switch, the LTM trigger command comprising:
an indication of whether to expire any running time alignment timers upon the cell switch, an indication of whether to maintain timing advances, acquired for the set of candidate target cells before the cell switch, during or after the cell switch, an indication of whether to maintain and report the timing advances, acquired for the set of candidate target cells before the cell switch, during or after the cell switch, an indication of whether to maintain and report cell IDs for the set of candidate target cells during or after the cell switch, an indication of whether to maintain and report the cell IDs and the timing advances during or after the cell switch, and an indication of whether to maintain and report the cell ID and the timing advance for a target cell of the set of candidate target cells if a time alignment timer for the target cell is running and will not expire within the predefined time duration during or after the cell switch;

receive, from one of the first network node or a third network node which supports DU functionality and a layer 2 protocol of a radio access network, a second additional configuration information for transmitting a timing advance report and indicating inclusion, in the timing advance report, of:

timing advance group ID, physical cell IDs (PCIs) of a timing advance group (TAG), transmission configuration index states (TCI-states) of a TAG, TCI-state IDs of a TAG, timing advance value associated with a TAG, time alignment timer status associated with a TAG, timing advance acquisition method and UE preference for timing advance acquisition, and UE capabilities for timing advance acquisition, the UE capabilities comprising a number of TAGs, a number of cells, a method for acquiring timing advance, and timing advance update limitations, wherein the third network node supports the target cell, wherein, prior to a cell switch to the target cell, the second additional configuration information is received from the first network node and comprises uplink resources allocated by the third network node, and wherein, after the cell switch, the timing advance report is transmitted towards the third network node using the uplink resources;

transmit, towards one of the first network node or the third network node, the timing advance report;

receive, from the third network node, after a cell switch to the target cell, updated configuration information comprising:

an indication of whether to maintain timing advance values for at least one cell of the set of candidate target cells, an indication to add a cell to a timing advance group, an indication to add a transmission configuration index state (TCI-state) to a timing advance group, an indication to remove a cell from a timing advance group, an indication to remove a TCI-state from a timing advance group, an indication to configure a new timing advance group, a time alignment timer configuration, and configurations on the method for acquiring timing advance after time alignment timer expiry;

implement a first configuration based on the configuration information; and implement a second configuration based on the first and second additional configuration information, wherein the second configuration indicates to:

not reacquire timing advance for a candidate target cell among the set of candidate target cells if the candidate target cell has measurement quality below a predefined value, measurement quality below a threshold with respect to the serving cell, and measurement quality below a threshold with respect to at least one other candidate target cell among the set of candidate target cells, use a different method to reacquire timing advance, restart the time alignment timers, and use new time alignment timers.

* * * * *